US00RE35662E

United States Patent [19]

Murata et al.

[11] E Patent Number: Re. 35,662

[45] Reissued Date of Patent: Nov. 18, 1997

[54] VALVE OPERATING APPARATUS

[75] Inventors: Shinichi Murata; Noboru Nakamura; Michiyasu Yoshida; Hideki Miyamoto, all of Kyoto, Japan

[73] Assignee: Mitsubishi Jidosha Kogyo Kabushiki Kaisha, Tokyo, Japan

[21] Appl. No.: 389,315

[22] PCT Filed: Jan. 18, 1991

[86] PCT No.: PCT/JP91/00053

§ 371 Date: Sep. 18, 1991

§ 102(e) Date: Sep. 18, 1991

[87] PCT Pub. No.: WO91/10816

PCT Pub. Date: Jul. 25, 1991

Related U.S. Patent Documents

Reissue of:

[64] Patent No.: 5,186,128
Issued: Feb. 16, 1993
Appl. No.: 762,021
Filed: Jan. 18, 1991

[30] Foreign Application Priority Data

| | | | |
|---|---|---|---|
| Jan. 18, 1990 | [JP] | Japan | 2-009425 |
| Mar. 31, 1990 | [JP] | Japan | 2-033577 |
| Mar. 31, 1990 | [JP] | Japan | 2-033578 |
| Mar. 31, 1990 | [JP] | Japan | 2-033579 |

[51] Int. Cl.[6] ..... F01L 1/34; F01L 1/18

[52] U.S. Cl. ..... 123/90.16; 123/90.39

[58] Field of Search ..... 123/90.15, 90.16, 123/90.39, 90.4, 90.41, 90.44

[56] References Cited

U.S. PATENT DOCUMENTS

| | | | |
|---|---|---|---|
| 4,429,853 | 2/1984 | Chaffiotte et al. | 123/90.16 |
| 4,726,332 | 2/1988 | Nishimura et al. | 123/90.16 |
| 4,768,475 | 9/1988 | Ikemura | 123/90.16 |
| 4,844,023 | 7/1989 | Konno et al. | 123/90.16 |
| 4,901,685 | 2/1990 | Fukuo et al. | 123/90.16 |
| 5,099,806 | 3/1992 | Murata et al. | 123/90.16 |

FOREIGN PATENT DOCUMENTS

| | | | |
|---|---|---|---|
| 44123 | 4/1979 | Japan | 123/90.16 |
| 114633 | 9/1979 | Japan | 123/90.16 |
| 233306 | 11/1985 | Japan | 123/90.16 |

*Primary Examiner*—Weilun Lo
*Attorney, Agent, or Firm*—Birch, Stewart, Kolasch & Birch, LLP

[57] ABSTRACT

A valve operating apparatus, which transmits the rotation of the crankshaft of an automotive engine to the intake and exhaust valves to open and close the valves, can selectively vary the timing to open and close the valves and ther lifts of the valves. The valve operating apparatus includes a camshaft with low- and high-speed cams and low- and high-speed rocker arms, one of which is fixed to and the other rotatably supported on a rocker shaft. The valves can be opened and closed by the low-speed rocker arm. The other rocker arm and the rocker shaft can be engaged and disengaged by an engaging mechanism that is actuated by an actuating mechanism depending on the operating condition of the engine.

76 Claims, 22 Drawing Sheets

VALVE OPERATING APPARATUS

Matter enclosed in heavy brackets [ ] appears in the original patent but forms no part of this reissue specification; matter printed in italics indicates the additions made by reissue.

TECHNICAL FIELD

The present invention relates to a valve operating apparatus for selectively transmitting the rotation of high- and low-speed cams to intake and exhaust valves in an engine to select the timing to open and close the intake and exhaust valves and the lifts or distances by which they are lifted, so that the engine can have good output power characteristics in low- and high-speed ranges of operation thereof, and more particularly to a valve operating apparatus having rocker arms, a rocker shaft, and an engaging means for engaging and disengaging the rocker arms and the rocker shaft, between the high- and low-speed cams and the intake and exhaust valves.

BACKGROUND ART

Heretofore, the intake and exhaust valves of automotive OHC (overhead camshaft) engines are opened and closed by the rotation of the crankshaft that is transmitted through a valve operating apparatus.

Some valve operating apparatus are capable of not only opening and closing the intake and exhaust valves at a predetermining timing with a predetermined lift, but also selectively varying the timing and the lift. The valve operating apparatus with such a mechanism for selecting valve operating modes can control the valve overlap, etc., for optimum values depending on the operating conditions of the engine, so that the engine can produce the highest possible output power at all times.

More specifically, one known valve operating apparatus has a low-speed cam having a cam profile for a low-speed range of operation of the engine, and a high-speed cam having a cam profile for a high-speed range of operation of the engine, the low- and high-speed cams being mounted on a camshaft. The timing to open and close the valves of the engine is controlled by the low-speed cam in the low-speed range of operation, and by the high-speed cam in the high-speed range of operation.

FIGS. 38 through 40 of the accompanying drawings show a mechanism for selecting high- and low-speed cams.

As shown in FIG. 38, rocker arms 104, 105, 104' are interposed between cams 102, 103, 102' and valves 101 to be actuated by the cams.

The cams 102, 102' serve as low-speed cams, and the cam 103 as a high-speed cam. The rocker arms 104, 104' are low-speed rocker arms that are actuated by the cams 102, 102', respectively, and the rocker arm 105 is a high-speed rocker arm that is actuated by the cam 103.

The rocker arms 104, 105, 104' are angularly movably supported on a rocker shaft 106, and angularly movable about the rocker shaft 106 when they are pushed by the cams 102, 103, 102'.

The low-speed rocker arms 104, 104' and the high-speed rocker arm 105 can be engaged or disengaged by pistons 107, 108 and a stopper 109.

More specifically, as shown in FIGS. 39 and 40, the pistons 107, 108 and the stopper 109, which are arranged in series with each other and held in contact end to end, are disposed in cylinders 104a, 105a, 104'a that are defined coaxially in the rocker arms 104, 105, 104', respectively. The rocker shaft 106 and the rocker arm 104' have oil passages 106a, 104'b defined respectively therein. When oil is supplied through the oil passages 106a, 104'b into a space in an end of the cylinder 104'a, the pistons 107, 108 and the stopper 109 are axially moved forwardly, thereby connecting the low-speed locker arms 104, 104' and the high-speed rocker arm 105 to each other. When the oil is discharged, the pistons 107, 108 and the stopper 109 are retracted under the bias of a return spring 110, thereby disconnecting the low-speed rocker arms 104, 104' and the high-speed rocker arm 105 from each other.

The rocker arm 105 is normally urged upwardly by a return spring 111.

In the low-speed range of operation, as shown in FIG. 39, the oil is discharged from the space in the end of the cylinder 104'a, allowing the pistons 107, 108 and the stopper 109 to move to the right under the force of the return spring 110. The piston 107 is placed in the rocker arm 104', the piston 108 in the rocker arm 105, and the stopper 109 in the rocker arm 104. Therefore, the high-speed rocker arm 105 and the low-speed rocker arms 104, 104' are disconnected from each other.

The cam profile of the low-speed cams 102, 102' is now effective to actuate the valves 101.

In the high-speed range of operation, as shown in FIG. 40, the oil is supplied into the space in the end of the piston 104'a to displace the pistons 107, 108 and the stopper 109 to the left under the oil pressure.

The pistons 107, 108 are now positioned such that they connect the low-speed rocker arms 104, 104' and the high-speed rocker arm 105.

The cam lift provided by the high-speed cam 103 is larger than the cam lift provided by the low-speed cams 102, 102' (see FIG. 10). Therefore, the valves 101 are actuated by the high-speed cam 103 while the low-speed cams 102, 102' are idly rotating.

The above conventional valve operating apparatus suffer some problems, to be solved by the present invention, as follows:

When the rocker arms 104, 104', 105 are to be interconnected, two steps of operation are required, i.e., the piston 107 pushes the piston 108, and the piston 108 pushes the stopper 109. At this time, the peripheral edge of the leading end of the piston 107 tends to strike the rocker arm 105 or to be bounced back by the rocker arm 105, and the peripheral edge of the leading end of the piston 108 tends to be bounced back by the rocker arm 104.

When the piston 108 is bounced back, the piston 107 is also bounced back by the piston 108. These pistons 107, 108 are then moved back again to connect the rocker arms 104, 104', 105.

The aforesaid drawback is caused because the rocker arms for reciprocally moving the valves need to be interconnected. The rocker arms 104, 104', 105 cannot smoothly be connected, and the leading ends of the pistons 107, 108 are liable to get worn rapidly.

In addition, since the above connecting mechanism is mounted in the ends of the angularly movable rocker arms, the valve operating apparatus is relatively large in size and weight, and cannot incorporate roller bearings therein.

SUMMARY OF THE INVENTION

To solve the above problems, there has been proposed an engaging means disposed between a rocker shaft and either a high-speed rocker arm disposed in juxtaposed relationship to low-speed rocker arms that open and close valves, or one of the low-speed rocker arms, for smoothly engaging and disengaging the rocker shaft and the high-speed rocker arm or one of the low-speed rocker arms. However, since the low- and high-speed cams are held in sliding contact with slippers of the low- and high-speed rocker arms, the frictional resistance is relatively high, resulting in a loss of engine output power. While the engine is idling, pitting is likely to occur between the high-speed cam and the slipper of the high-speed rocker arm. Therefore, it is necessary to employ an expensive tip material for the slippers of the rocker arms.

The engaging means comprises a plunger that can be actuated by an actuating system. It is desirous that the plunger be durable enough, and the rocker shaft and the rocker arms be engageable and disengageable by the plunger smoothly with good response.

Therefore, it is an object of the present invention to provide a valve operating apparatus which can smoothly engage and disengage a high-speed rocker arm or one of low-speed rocker arms and a rocker shaft.

Another object of the present invention is to provide a valve operating apparatus which can reduce a loss in engine output power due to the frictional resistance between low- and high-speed cams and low- and high-speed rocker arms.

Still another object of the present invention is to provide a valve operating apparatus which includes an engaging means with highly durable components.

Yet still another object of the present invention is to provide a valve operating apparatus which includes an engaging means comprising a plunger that can engage and disengage a rocker shaft and rocker arms smoothly.

According to the present invention, there is provided a valve operating apparatus for use in an engine, comprising a camshaft with low- and high-speed cams mounted thereon, a rocker shaft disposed adjacent to the camshaft, a low-speed rocker arm fixed to the rocker shaft for actuating the valve, a high-speed rocker arm rotatably supported on the rocker shaft parallel to the low-speed rocker arm, engaging means for selectively engaging and disengaging the rocker shaft and the high-speed rocker arm, and actuating means for actuating the engaging means depending on an operating condition of the engine.

According to the present invention, there is also provided a valve operating apparatus for use in an engine, comprising a camshaft with low- and high-speed cams mounted thereon, a rocker shaft disposed adjacent to the camshaft, a high-speed rocker arm fixed to the rocker shaft and angularly movable about the rocker shaft, a low-speed rocker arm rotatably supported on the rocker shaft parallel to the low-speed rocker arm for actuating the valve, engaging means for selectively engaging and disengaging the rocker shaft and the low-speed rocker arm, and actuating means for actuating the engaging means depending on an operating condition of the engine.

In each of the above valve operating apparatus, the engaging means comprises a hole defined in a surface of the high- or low-speed rocker arm which is rotatable about the rocker shaft, a through hole defined in the rocker shaft perpendicularly to the axis of the rocker shaft, a plunger movably mounted in the through hole, and an oil chamber defined between a rear end of the plunger and the rotatable surface of the high- or low-speed rocker arm.

In each of the valve operating apparatus, the actuating means comprises an oil passage defined in the rocker shaft, and hydraulic pressure means for supplying oil under pressure through the oil passage to the engaging means to selectively engage and disengage the rocker shaft and the high- or low-speed rocker arm.

Since the rocker shaft and the high- or low-speed rocker arm are engaged or disengaged by the engaging means, they can be engaged or disengaged smoothly.

In the case where the engaging means has the plunger disposed in the rocker shaft and engageable in or disengageable from the hole in the rotatable surface of the rocker arm, the engaging means is improved in durability for smoother engaging or disengaging operation. In the case where the actuating means is composed of the oil passage and the hydraulic pressure means for engaging or disengaging the rocker shaft and the rocker arm, the valve operating apparatus is simplified in structure.

The engaging means may comprise a plunger with a flange on one end thereof, and a biasing member disposed between the flange and the rocker shaft, for normally urging the plunger into a stored position within the rocker shaft. Alternatively, the engaging means may include a through hole having a larger-diameter portion that is larger in diameter than the hole in the rotatable surface of the rocker arm, a plunger with a flange on one end thereof, and a spring for normally urging the plunger into the stored position. The flange of the plunger is slidable in the larger-diameter portion, and may have a projection on its end in the larger-diameter portion. With this arrangement, the rocker arm is made simple in structure, and the flanged end of the plunger is prevented from entering the hole in the rotatable surface of the rocker arm. In addition, the projection of the flange can slide smoothly against the rotatable surface of the rocker arm.

The low- and high-speed rocker arms may have respective rollers held in rolling contact with the cams for reduced frictional resistance.

Alternatively, the high-speed rocker arm may have a roller held in rolling contact with the high-speed cam, and the low-speed rocker arm may have a slipper held in sliding contact with the low-speed cam, so that the frictional resistance between the cams and the rocker arms may be reduced in a low-speed range and the time area plotted when the valves are opened is prevented from being reduced, thus reducing a loss in engine output power in a high-speed range.

DETAILED DESCRIPTION OF THE PREFERRED EMBODIMENTS

First, a valve operating apparatus according to an embodiment of the present invention will be described below with reference to FIGS. 1 through 8.

Figure 1:
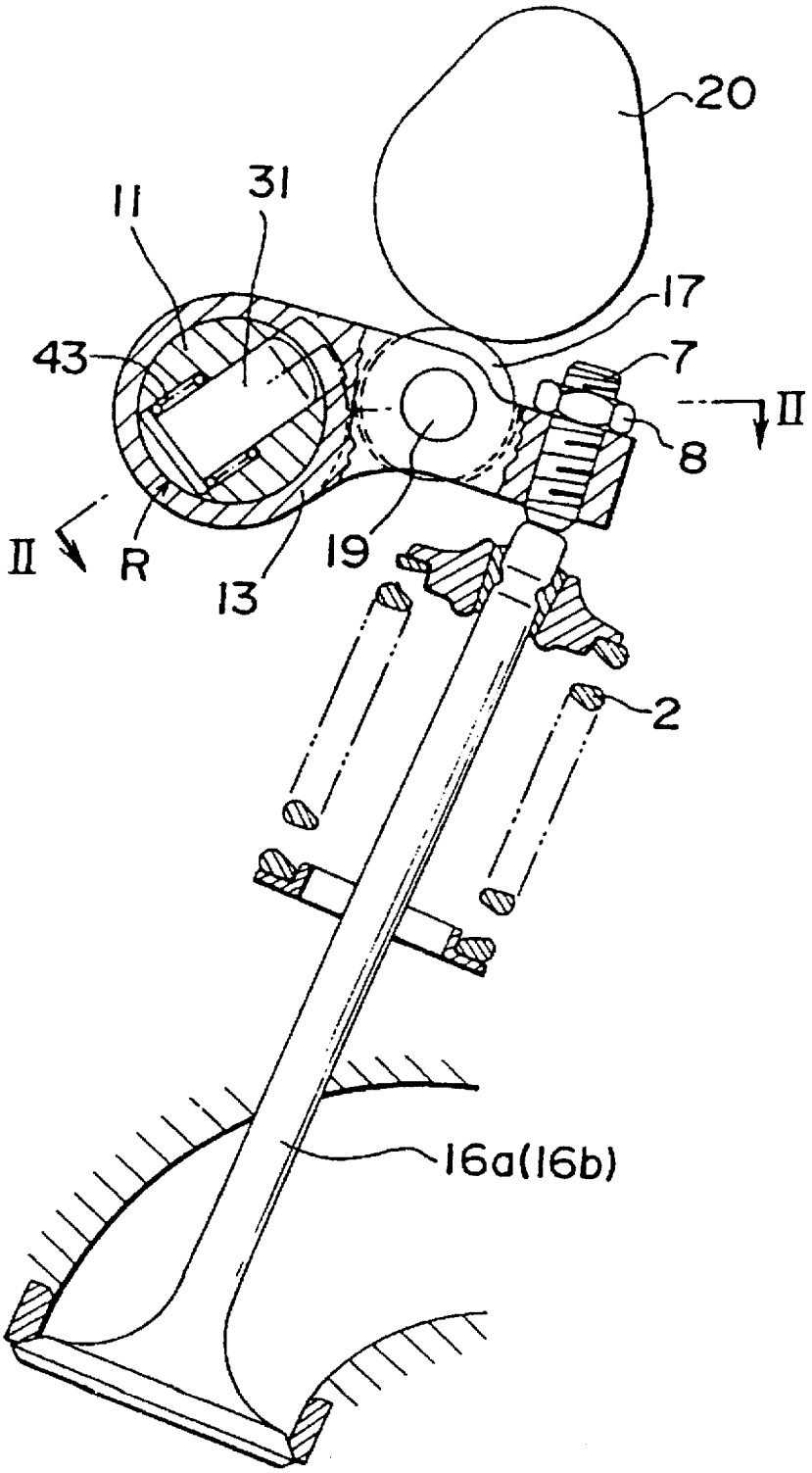
FIG. 1 is a cross-sectional view taken along line I—I of FIG. 2, the view showing a valve operating apparatus according to an embodiment of the present invention.
Figure 2:
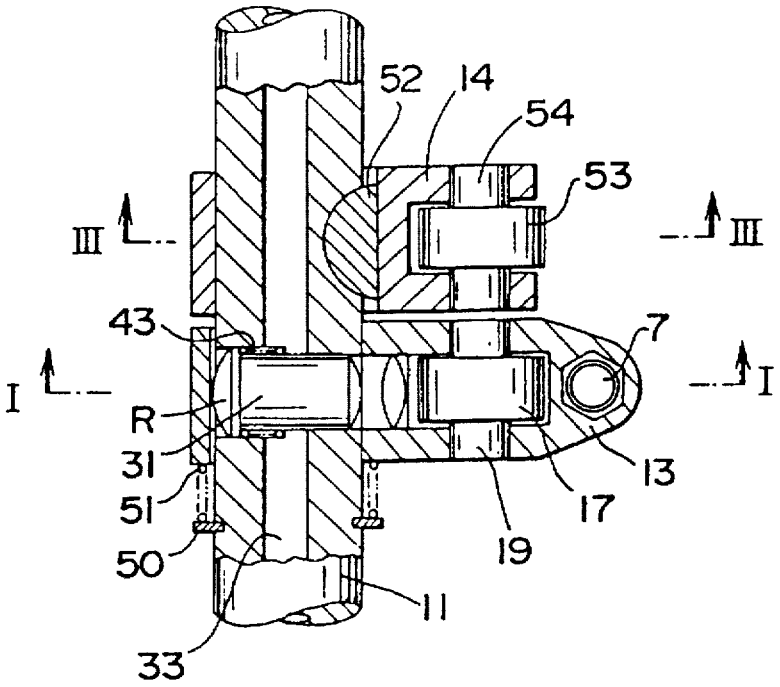
FIG. 2 is a fragmentary cross-sectional view taken along line II—II of FIG. 1.
Figure 3:
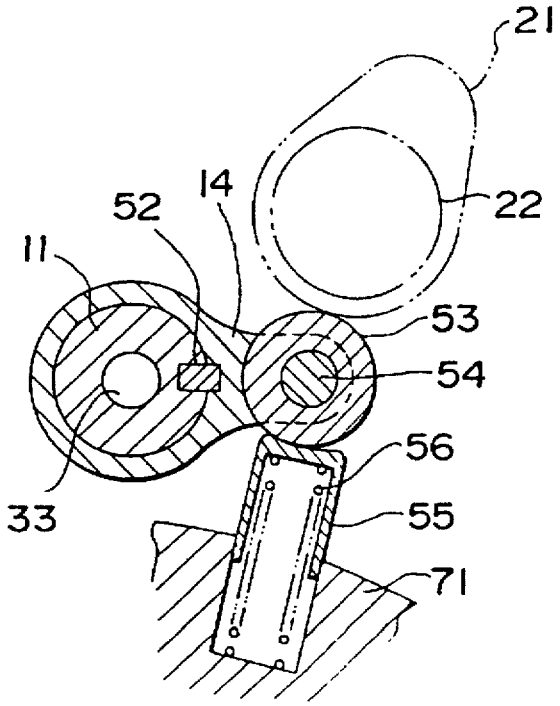
FIG. 3 is a cross-sectional view taken along line III—III of FIG. 2.
Figure 4:
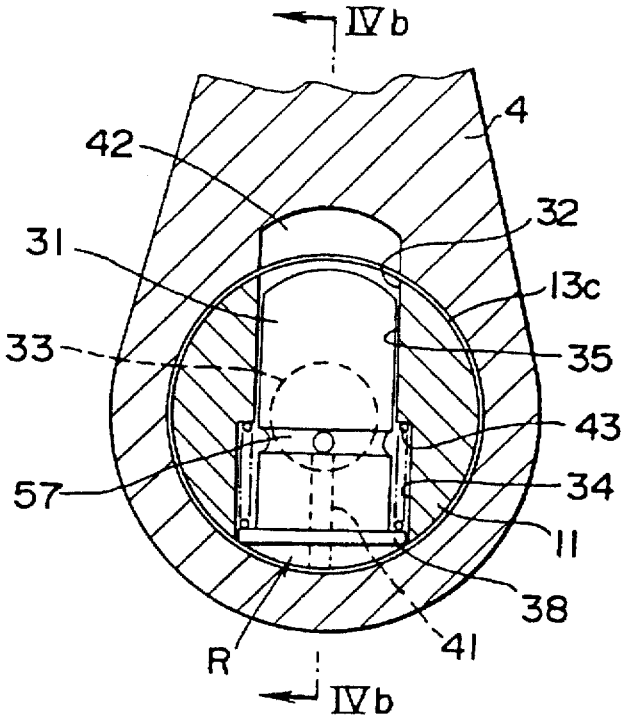
FIG. 4(a) is a fragmentary transverse cross-sectional view showing an engaging means that is in a releasing position.
FIG. 4(b) is a fragmentary cross-sectional view taken along line IVb—IVb of FIG. 4(a)
Figure 4:
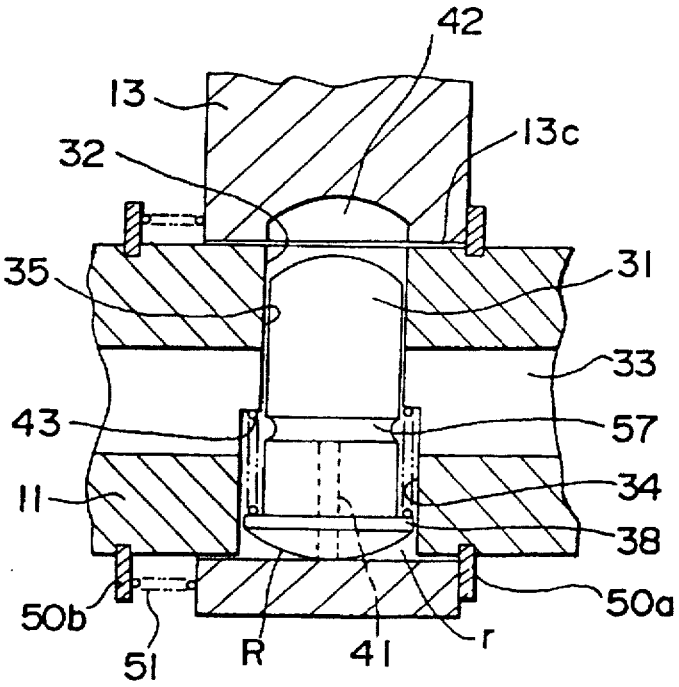
Figure 5:
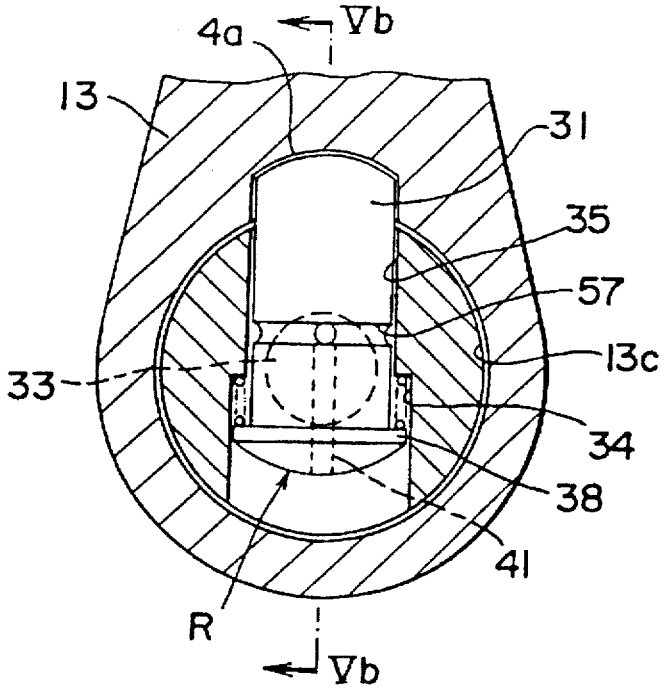
FIG. 5(a) is a fragmentary transverse cross-sectional view showing the engaging means that is in a coupling position.
FIG. 5(b) is a fragmentary cross-sectional view taken along line Vb—Vb of FIG. 5(a)
Figure 5:
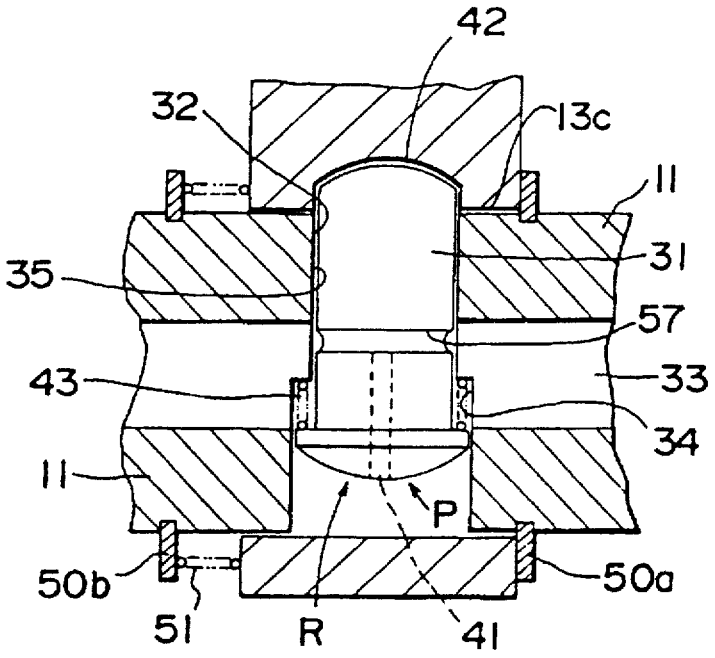

The valve operating apparatus is provided for opening and closing intake and exhaust valves of an automotive OHC (overhead camshaft) engine or the like. The engine is of a two-valve design having intake and exhaust valves for each of a plurality of cylinders (not shown). The engine has a camshaft 22 (FIG. 3) rotatable in ganged relationship to the crankshaft. As shown in FIGS. 1 through 3, the camshaft 22 has a low-speed cam 20 having a cam profile for a low-speed range of operation of the engine, and a high-speed cam 21 having a cam profile for a high-speed range of operation of the engine, the low- and high-speed cams 20, 21 being disposed in juxtaposed relationship to each other.

Figure 10:
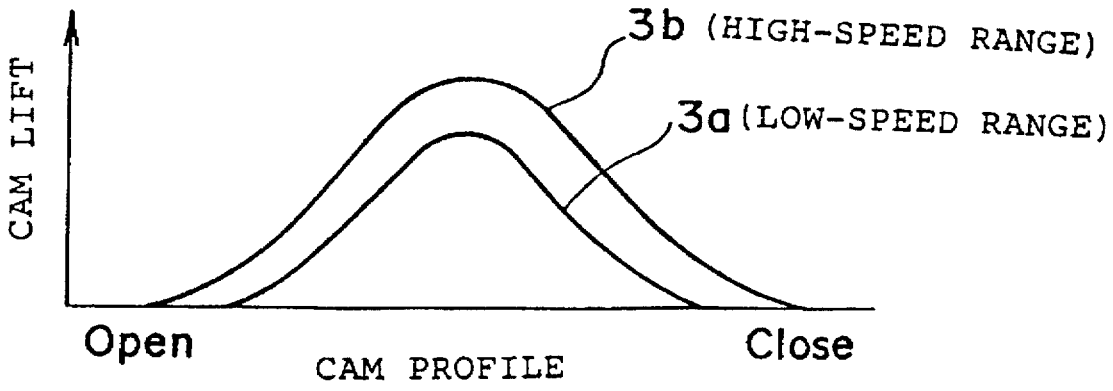
FIG. 10 is a diagram showing cam profiles in the valve actuating apparatus shown in FIG. 1.

The cam profiles for the low- and high-speed ranges of operation are indicated by curves 3a, 3b, respectively, in FIG. 10.

A rocker shaft 11 extends parallel to the camshaft 22. On the rocker shaft 11, there are mounted a low-speed rocker arm 13 actuatable by the low-speed cam 20 and a high-speed rocker arm 14 actuatable by the high-speed cam 21, the low- and high-speed rocker arms 13, 14 being parallel to each other.

The low-speed rocker arm 13 is pivotally mounted on the rocker shaft 11 for free rotation thereabout, and can be made rotatable in unison with the rocker shaft 11 by an engaging means R.

A shaft 19 with a roller bearing 17 mounted thereon is supported on an arm member of the low-speed rocker arm 13. The roller bearing 17 has an upper portion engaging the low-speed cam 20. Therefore, actuating forces are transmitted from the low-speed cam 20 to the low-speed rocker arm 13 through the roller bearing 17 and the shaft 19.

An adjusting screw 7, which has been suitably adjusted in position and secured in place by a nut 8, is threaded through the tip end of the low-speed rocker arm 13. The adjusting screw 7 has a lower end engaging the upper end of the valve stem of an intake or exhaust valve 16a (16b). The upper end of the valve stem is normally urged to move obliquely upwardly (FIG. 1) by a valve spring 2.

When the low-speed cam 20 rotates, the tip end of the low-speed rocker arm 13 is caused to swing vertically in FIG. 1, thereby vertically actuating the valve 16a (16b) through the adjusting screw 7.

The high-speed rocker arm 14 supports on an arm member thereof a shaft 54 on which a roller bearing 53 is mounted. The roller bearing 53 has an upper portion engaging the high-speed cam 21. Therefore, actuating forces are transmitted from the high-speed cam 21 to the high-speed rocker arm 14 through the roller bearing 53 and the shaft 54.

The high-speed rocker arm 14 is supported on the rocker shaft 11. The high-speed rocker arm 14 is fixed to the rocker shaft 11 by a semicircular key 52 interposed therebetween so that the high-speed rocker arm 14 can rotate in unison with the rocker shaft 11 at all times.

The lower end of the swingable end (i.e., the roller bearing 53) of high-speed rocker arm 14 is supported by a cylinder head 71 through a piston 55 that is biased by a support spring 56 as a first biasing means. When the high-speed rocker arm 14 swings, it returns upwardly under the biasing forces of the support spring 56.

Consequently, when the high-speed cam 21 rotates, the high-speed rocker arm 14 is angularly moved, and at the same time the rocker shaft 11 is also angularly moved back and forth about its own axis.

The engaging means R is of a structure described below.

As shown in FIGS. 4(a), 4(b), 5(a), and 5(b), the rocker shaft 11 has a through hole 32 defined in a portion thereof on which the low-speed rocker arm 13 is supported, the through hole 32 extending in the diametrical direction of the shaft 11. The engaging means R comprises a coupling pin 31 as a plunger loosely inserted in the through hole 32.

Figure 6:
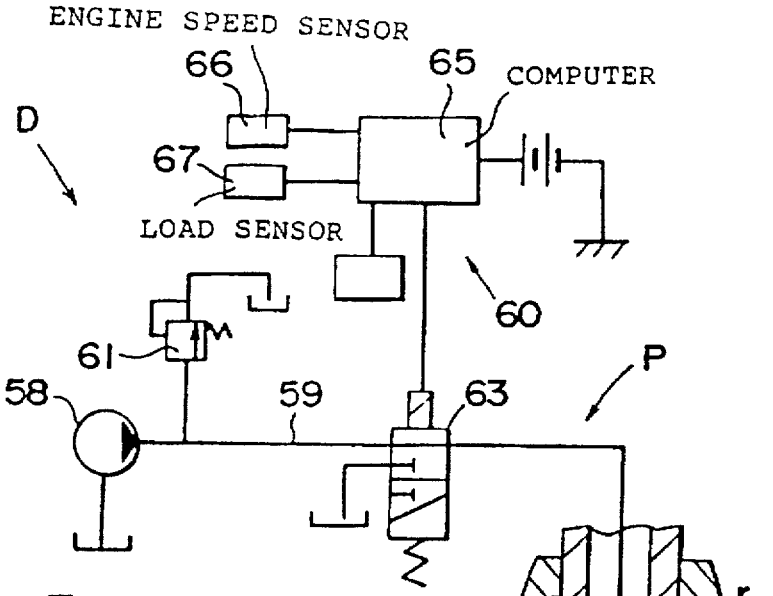
FIG. 6 is a schematic view of an actuating system employed in the valve operating apparatus shown in FIG. 1.

The coupling pin 31 can project radially outwardly of the rocker shaft 11 under oil pressure from a hydraulic means P (see FIG. 6). The low-speed rocker arm 13 has an inner rotatable surface 13c pivotally supported on and around the rocker shaft 11, the inner rotatable surface 13c having a hole 42 into which the coupling pin 31 can be fitted when it projects out of the through hole 32.

The coupling pin 31 has an annular oil groove 57 defined in a central outer circumferential surface thereof, and an oil passage 41 extending from an outer circumferential surface thereof to an axial center thereof and communicating between the oil groove 57 and the rear end of the coupling pin 31. Therefore, oil can be supplied through the oil groove 57 and the oil passage 41 to the rear end of the coupling pin 31.

The coupling pin 31 also has a flange 38 on the outer circumferential edge of the rear end thereof. The through hole 32 includes a larger-diameter portion 34 in which the flange 38 can slide, and a smaller-diameter portion 35 in which an upper portion of the coupling pin 31 slides.

A spring 43 is interposed as a biasing means between the flange 38 of the coupling pin 31 and a step that is defined between the smaller- and larger-diameter portions 35, 34 of the through hole 32, for normally urging the coupling pin 31 toward its rear end side, i.e., into a stored position.

The valve operating apparatus shown in FIG. 1 can be actuated by an actuating means D shown in FIG. 6. The actuating means D comprises an oil passage 33 defined axially centrally in the rocker shaft 11, and a hydraulic pressure means P for supplying oil pressure through the oil passage 33 to the engaging means R to operate the engaging means R for thereby engaging or disengaging the rocker shaft 11 and the low-speed rocker arm 13.

The hydraulic pressure means P comprises the oil passage 41 that provides communication between an oil chamber r behind the rear end of the coupling pin 31 and the oil passage 33, an oil supply passage 59 (FIG. 6) communicating with the oil passage 33, a hydraulic pressure pump 58 for supplying oil under high pressure to the oil supply passage 59, a hydraulic pressure control mechanism 60 connected to the oil supply passage 59, for supplying or blocking oil under pressure to the oil passage 33, and a relief valve 61 disposed between the hydraulic pressure control mechanism 60 and the hydraulic pressure pump 58, for relieving the oil pressure when the oil pressure in the oil supply passage 59 between the hydraulic pressure control mechanism 60 and the hydraulic pressure pump 58 increases beyond a predetermined pressure.

The hydraulic pressure control mechanism 60 comprises a directional control valve 63 shiftable between a first position in which oil is supplied under pressure from the hydraulic pressure pump 58 to the oil passage 33 and a second position in which it disconnects the oil passage 33 from the hydraulic pressure pump 58 and connects the oil passage 33 to a low-pressure oil tank 62, a solenoid 64 (FIG. 7) for shifting the directional control valve 63 selectively to one of the first and second positions, a computer 65 for controlling the energization of the solenoid 64 depending on the rotational speed and load of the engine, an engine speed sensor 66 for supplying engine speed information to the computer 60, and an engine load sensor 67 for supplying engine load information to the computer 65.

Figure 7:
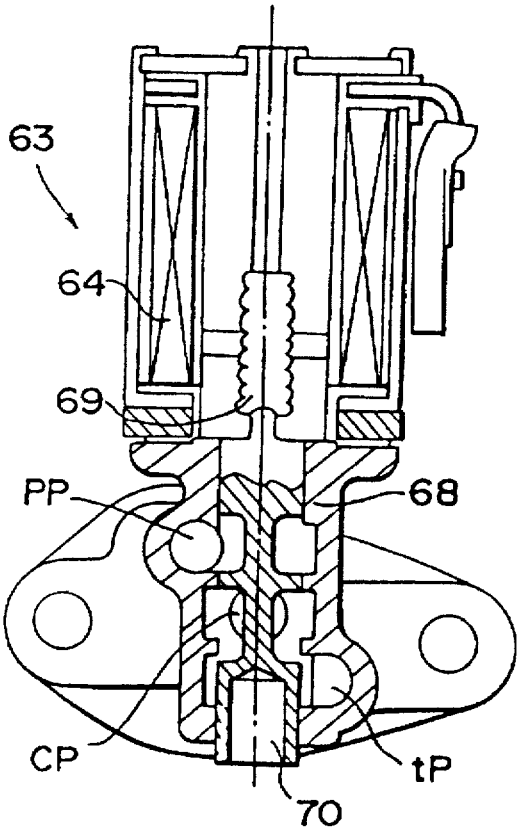
FIG. 7 is an enlarged cross-sectional view of a directional control valve in the actuating system shown in FIG. 6.
Figure 7:
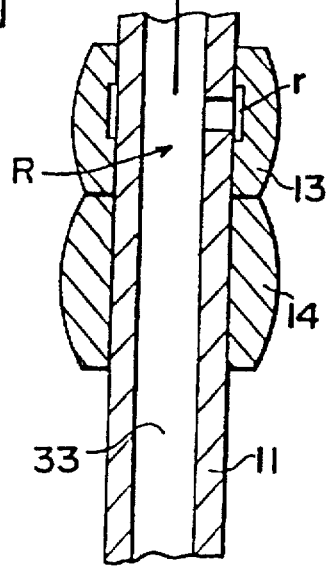

The directional control valve 63 and the solenoid 64 are shown in detail in FIG. 7. The solenoid 64 is housed in an upper portion of a casing 68, and the directional control valve 63 has a valve spool 70 slidably housed in a lower portion of the casing 68, the valve spool 70 being normally biased to move downwardly (FIG. 7) by a spring 69. The casing 68 has a pump port PP, a tank port tp, and a control port CP which face the valve spool 70. When the directional control valve 63 is not actuated by the solenoid 64, it is in the second, position, and the control port CP and the tank port tp are held in communication with each other. When the directional control valve 63 is actuated by the solenoid 64, it is in the first position, and the control port CP and the pump port PP are held in communication with each other.

Figure 8:
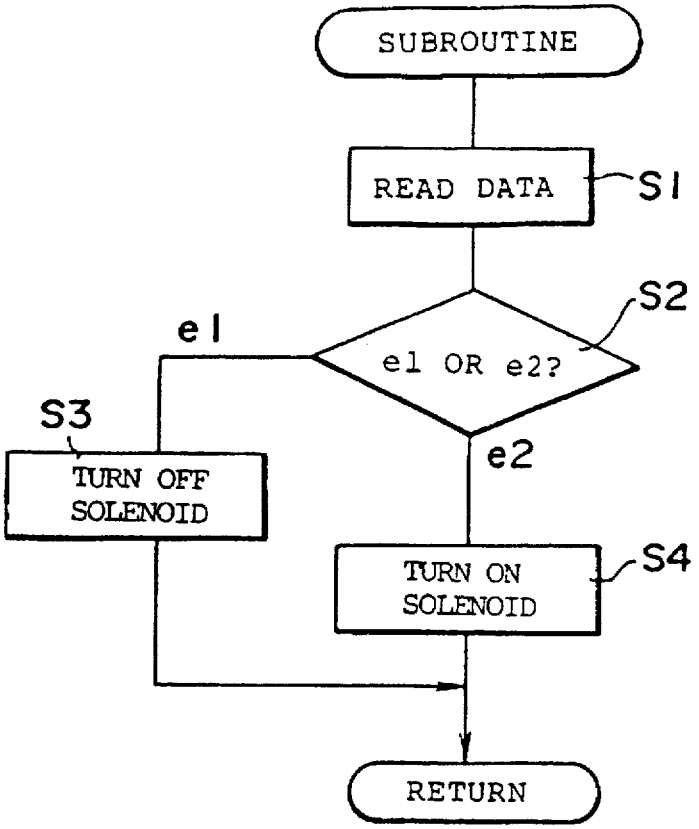
FIG. 8 is a flowchart of a valve control program for controlling the actuating system shown in FIG. 6.
Figure 9:
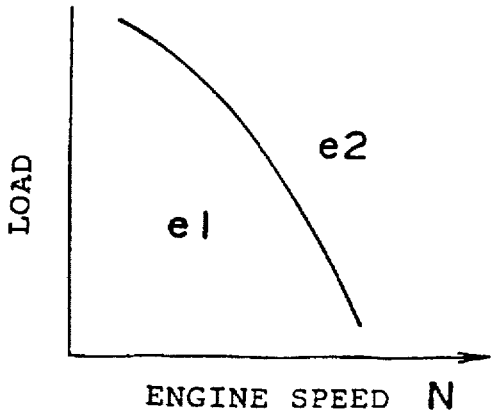
FIG. 9 is a diagram illustrating a map for determining ranges of engine operation, the map being used by the actuating system shown in FIG. 6.

The computer 65 has a read-only memory (not shown) which stores a valve control program as shown in FIG. 8 and a map for determining ranges of operation as shown in FIG. 9.

When a valve control subroutine is initiated, the computer 65 reads the present rotational speed of the engine and the present load on the engine in a step S1. Then, the computer 65 determines a present range of operation of the engine. Specifically, the computer 65 determines, from the map shown in FIG. 9, whether the present range is a low-speed cam range e1 in which the rotational speed of the engine is in a low-speed range and the load on the engine is in a low-load range, or a high-speed cam range e2 in which the rotational speed of the engine is in a high-speed range and the load on the engine is in a high-load range, in a step S2. Then, control goes to a step S3 if the present range is the low-speed cam range e1, or a step S4 if the present range is the high-speed cam range e2. In the step S3, the computer 65 de-energizes the solenoid 64 to hold the coupling pin 31 in the stored position shown in FIGS. 4(a) and 4(b). Therefore, the intake and exhaust valves are actuated by the low-speed cam 20. At this time, the projecting edge of the rear end of the flange 38 is held against or very closely to the inner rotatable surface 13c of the low-speed rocker arm 13. The tip end of the coupling pin 31 is retracted radially inwardly from the outer circumferential surface of the rocker shaft 11, so that the low-speed rocker arm 13 is released from the rocker shaft 11.

In the step S4, the computer 65 energizes the solenoid 64 to shift the coupling pin 31 into a projected position as shown in FIGS. 5(a) and 5(b), for actuating the intake and exhaust valves with the high-speed cam 21.

More specifically, oil under pressure is supplied from the hydraulic pressure pump 58 through the oil passage 33 and the oil passage 41 to the oil chamber r, and the coupling pin 31 is subjected to a differential pressure developed based on the difference between the rear-end pressure-bearing area of the flange 38 and the front-end pressure-bearing area of the flange 38. When the differential pressure exceeds the biasing force of the spring 43, the coupling pin 31 is shifted into the hole 42 in the low-speed rocker arm 13.

After the step S3 or S4, control returns to a main routine.

The position of the low-speed rocker arm 13 in the axial direction of the rocker shaft 11 is limited by a pair of first and second snap rings 50a, 50b and a thrust spring 51. As shown in FIG. 4(b), the first snap ring 50a is held against one side of the low-speed rocker arm 13 and engages the outer circumferential surface of the rocker shaft 11, and the second snap ring 50b is axially spaced from the other side of the low-speed rocker arm 13 and engages the outer circumferential surface of the rocker shaft 11. The thrust spring 51 is disposed under compression between the second snap ring 50b and the other side of the low-speed rocker arm 13.

When the engine operates in a low-speed range, no oil is supplied under pressure to the oil passage 33 in the rocker shaft 11, and the coupling pin 31 remains retracted within the rocker shaft 11, as shown in FIGS. 4(a) and 4(b).

The low-speed rocker arm 13 is therefore freely movable with respect to the rocker shaft 11. No movement of the rocker shaft 11 is transmitted to the low-speed rocker arm 13. Consequently, the cam lift of the low-speed cam 20 is transmitted through the roller bearing 17 and the shaft 19 to the low-speed rocker arm 13, which swings according to the cam profile of the low-speed cam 20.

Since the valve 16a (16b) is actuated in response to the swinging movement of the low-speed rocker arm 13, the valve 16a (16b) is reciprocally moved according to the cam profile of the low-speed cam 20 as shown in FIG. 10.

When the engine operates in a high-speed range, oil is supplied under pressure from the hydraulic pressure pump 58 to the oil passage 33 in the rocker shaft 11, and the coupling pin 31 projects from the outer circumferential surface of the rocker shaft 11 and is fitted into the hole 42 in the low-speed rocker arm 13, as shown in FIGS. 5(a) and 5(b).

The rocker shaft 11 and the low-speed rocker arm 13 are now fixed to each other for co-rotation. Since the rocker shaft 11 is actuated by the forces (cam lift) of the high-speed cam 21 that are transmitted through the high-speed rocker arm 14, the low-speed rocker arm 13 is also actuated by the cam lift of the high-speed cam 21.

More specifically, the high-speed rocker arm 14 is angularly moved by the high-speed cam 21, and the angular movement of the high-speed rocker arm 14 is transmitted through the rocker shaft 11 to the low-speed rocker arm 13.

This is because the cam lift of the high-speed cam 21 is greater than the cam lift of the low-speed cam 20 as shown in FIG. 10. Therefore, the swinging movement of the low-speed rocker arm 13 that is caused by the high-speed cam 21 overrides the swinging movement which would otherwise be caused by the low-speed cam 20. While the low-speed cam 20 is idly rotating, the low-speed rocker arm 13 is angularly moved according to the cam profile of the high-speed cam 21, thereby opening and closing the valve 16a (16b) in the high-speed range of operation.

FIGS. 11 through 14 show modifications of the valve operating apparatus according to the embodiment shown in FIG. 1.

Figure 11:
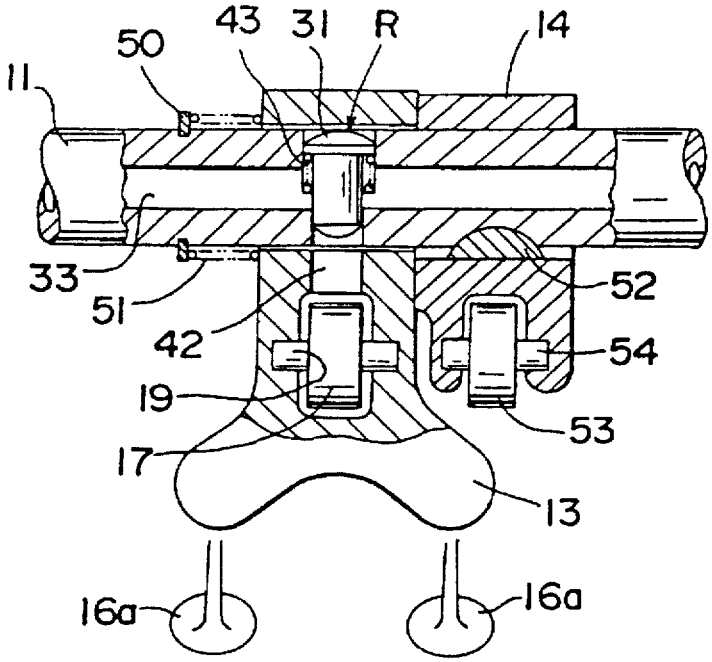
FIGS. 11 through 14 are fragmentary cross-sectional views of modified valve operating mechanisms according to the present invention.

In the modification shown in FIG. 11, the low-speed rocker arm 13 is of a bifurcated configuration for opening and closing two intake valves 16a simultaneously.

Figure 12:
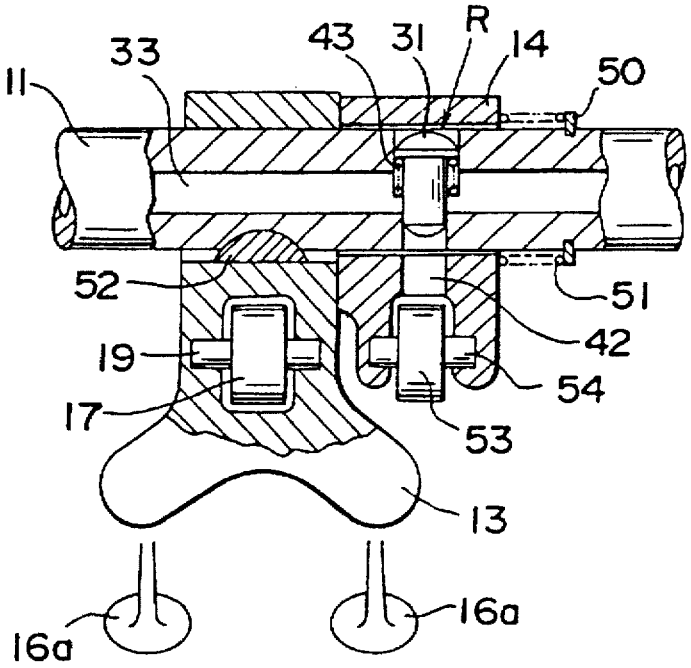

In the modification shown in FIG. 12, the engaging means R is disposed in the portion of the rocker shaft 11 on which the high-speed rocker arm 14, rather than the low-speed rocker arm 13, is pivotally supported. When the engaging means R releases the high-speed rocker arm 14 from the rocker shaft 11, no movement of the high-speed rocker arm 14 is transmitted to the low-speed rocker arm 13. Therefore, the low-speed rocker arm 13 is angularly moved by the low-speed cam 20. When the engaging means R fixes the high-speed rocker arm 14 to the rocker shaft 11, the movement of the high-speed rocker arm 14 is transmitted to the low-speed rocker arm 13, which is now angularly moved by the high-speed cam 21. The valve operating apparatus shown in FIG. 12 thus operates in the same manner as the valve operating apparatus shown in FIG. 11.

Figure 13:
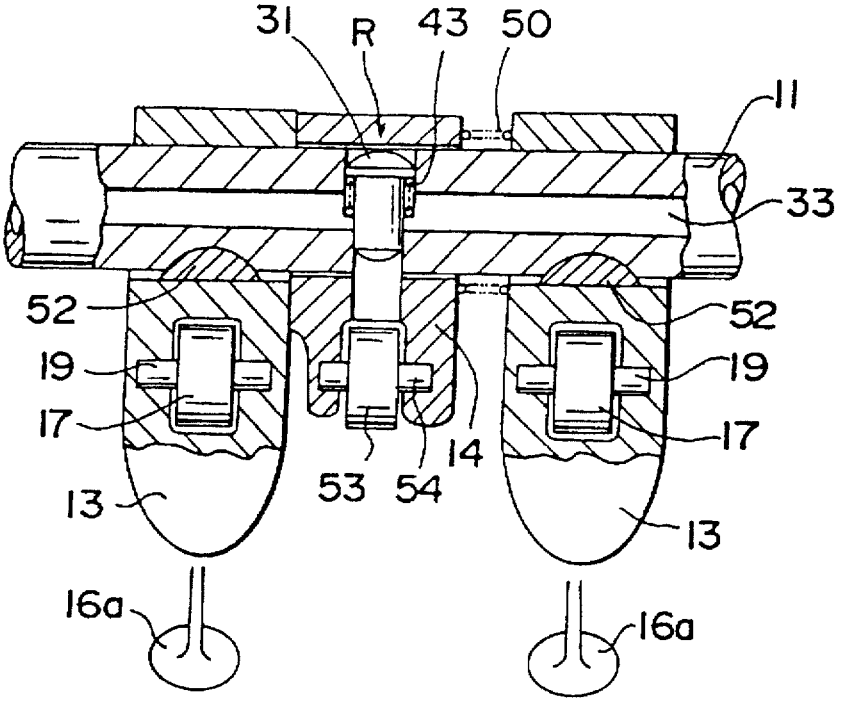
Figure 14:
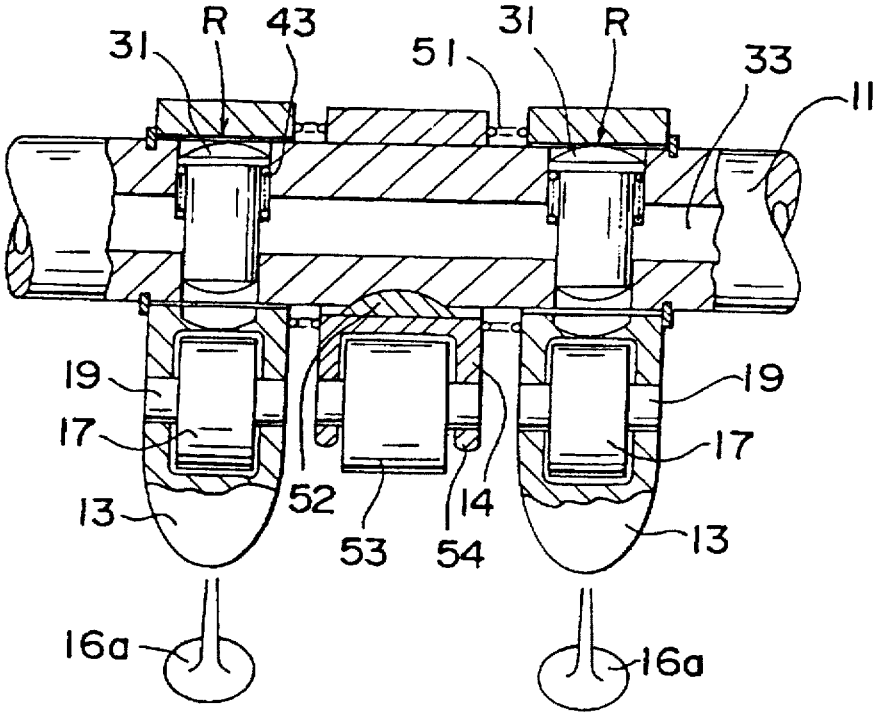

The modified valve operating apparatus shown in FIG. 13 includes two low speed rocker arms 13 associated with two intake valves 16a, respectively. Each of the rocker arms 13 is fixed to the rocker shaft 11. As with the modification shown in FIG. 12, the engaging means R is disposed between the high-speed rocker arm 14 and the rocker shaft 11. The low-speed rocker arms 13 operate to open and close the intake valves 16a simultaneously in the same manner as shown in FIG. 12.

The modified valve operating apparatus shown in FIG. 13 includes two rocker arms 13 associated with two intake valves 16a, respectively, with engaging means R being provided in combination with the respective rocker arms 13. The timing to open and close the intake valve 16a can be established for each of the rocker arms 13.

In each of the valve operating apparatus shown in FIGS. 1, 11 through 14, the rocker shaft 11 and the high-speed rocker arm 14 or the low-speed rocker arm 13 are smoothly engaged or disengaged by the engaging means R. Valve mode switching operation is therefore rendered reliable, and the weight of the valve operating apparatus is prevented from increasing for quicker response. The hydraulic pressure means P in the actuating means D can accurately more the coupling pin 31 selectively between the stored and projected positions depending on the rotational speed of the engine and the load on the engine.

Figure 15:
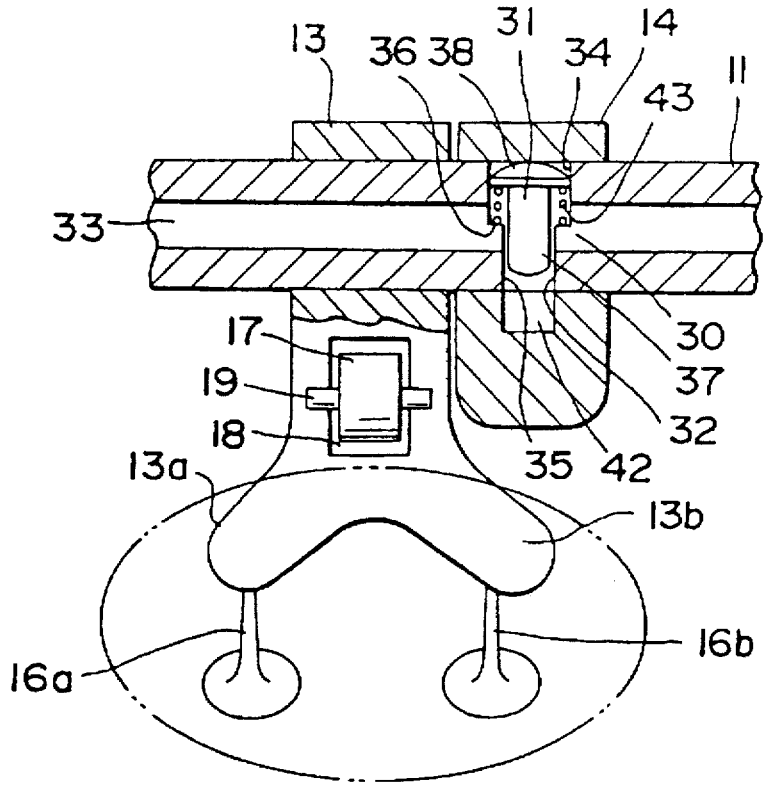
FIG. 15 is a fragmentary longitudinal cross-sectional view of a valve operating apparatus according to another embodiment of the present invention.

FIG. 15 shows a valve operating apparatus according to another embodiment of the present invention.

The valve operating apparatus shown in FIG. 15 is incorporated in a four-valve engine in which each of a plurality of cylinders has a pair of intake valves 16a, 16b.

Figure 16:
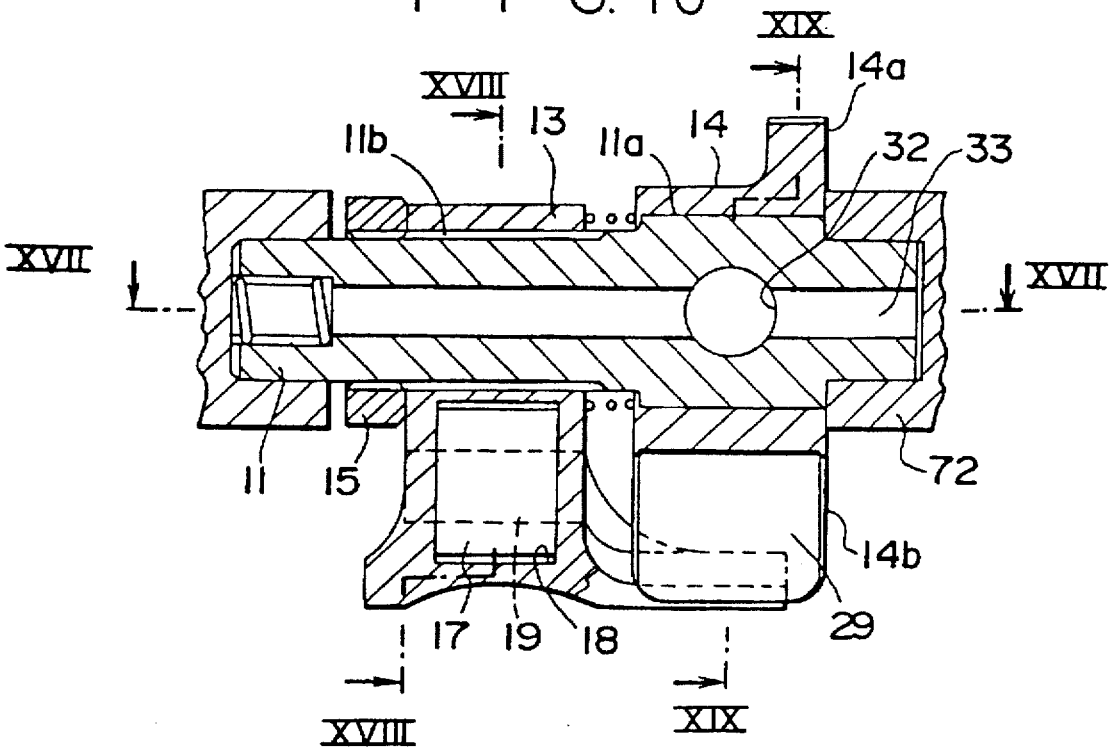
FIG. 16 is a fragmentary longitudinal cross-sectional view showing the manner in which low- and high-speed rocker arms are mounted in the valve operating apparatus shown in FIG. 15.

In FIGS. 15 and 16, a rocker shaft 11 is rotatably supported in a cylinder head by rocker shaft journals 72. The rocker shaft 11 supports a low-speed rocker arm 13 and a high-speed rocker arm 14 that extend parallel to each other. The rocker shaft 11 has a first arm support 11a on which the high-speed rocker arm 14 is rotatably supported, and a second externally threaded arm support 11b on which the low-speed rocker arm 13 is fixedly supported in threaded relationship. The low-speed rocker arm 13 is held in position against rotation by a lock nut 15 that is also threaded over the second arm support 11b of the rocker shaft 11. When the engine is in operation, the low-speed rocker arm 13 is angularly movable in unison with the rocker shaft 11.

Figure 18:
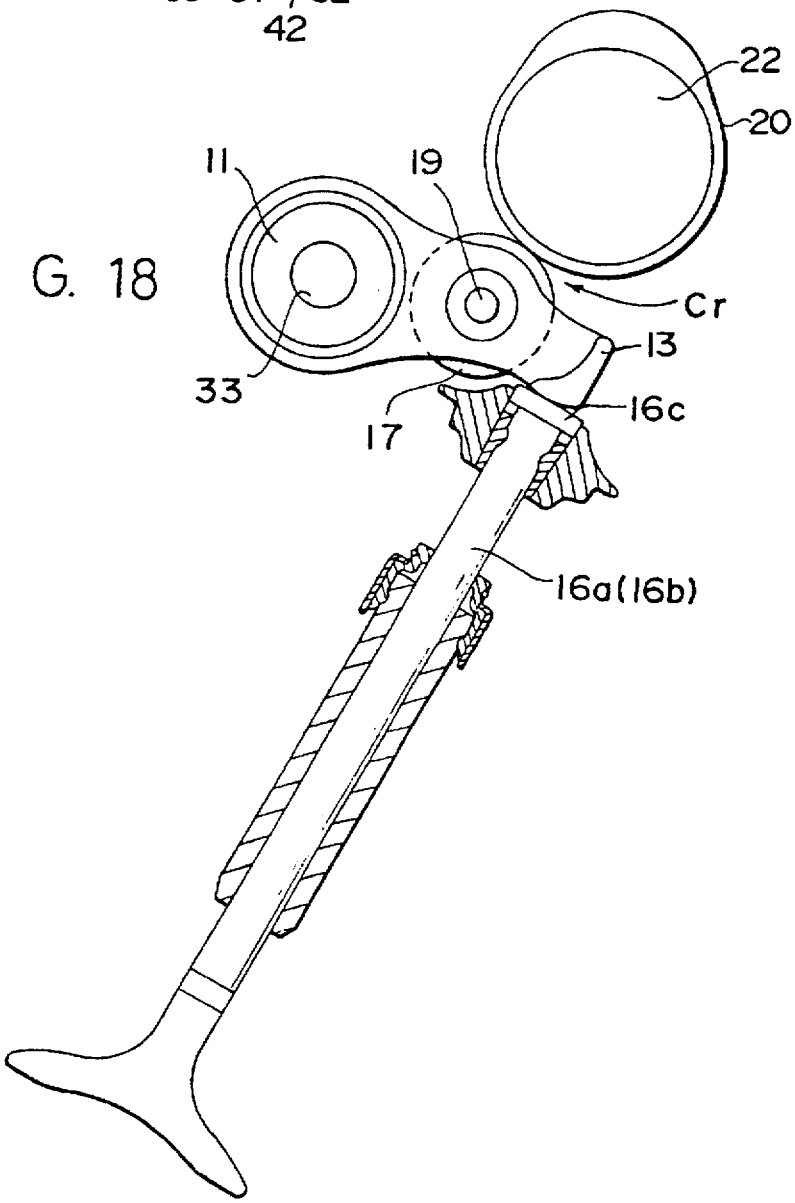
FIG. 18 is a cross-sectional view taken along line XVIII—XVIII of FIG. 16.

The low-speed rocker arm 13 has a bifurcated tip end composed of a pair of branched arms 13a, 13b that are held against the stem ends, respectively, of valves (in-take valves or exhaust valves) 16a, 16b in one cylinder. As shown in FIG. 18, shims 16c for adjusting the valve clearance are interposed between the stem ends of the valves 16a, 16b and the branched ends 13a, 13b of the low-speed rocker arm 13.

The low-speed rocker arm 13 has an opening 18 defined therein, and a roller 17 is rotatably supported in the opening 18 by a shaft 19. As shown in FIG. 18, a low-speed cam 20 is disposed above the low-speed rocker arm 13. The low-speed cam 20 and a high-speed cam 21 (see FIG. 19) are mounted on a camshaft 22. The low-speed rocker arm 13 can be angularly moved about the rocker shaft 11 by the low-speed cam 20 that is rollingly held against the roller 17.

The high-speed rocker arm 14 has projections 14a, 14b extending radially outwardly away from the rocker shaft 11. Against one of the projections 14a, there is held a spring-loaded lift mechanism 23 as a first biasing means for supporting the high-speed rocker arm 14. The lift mechanism 23 has a bottomed cylinder 26 fixedly inserted in an attachment hole 24 deemed in a cam journal 25 of the cylinder head. The lift mechanism 23 also has a bottomed cylinder 27 movably mounted in the fixed cylinder 26, the movable cylinder 27 being projectable out of and retractable into the fixed cylinder 26. The movable cylinder 27 is normally urged in a direction to project out of the fixed cylinder 26 by a coil spring 28 disposed between the fixed and movable cylinders 26, 27. Under the bias of the coil spring 28, a projecting end 27a of the movable cylinder 27 is pressed against the projection 14a of the high-speed rocker arm 14.

The other projection 14b of the high-speed rocker arm 14 has a slipper 29 slidably held against the high-speed cam 21. While the engine is in operation, the high-speed rocker arm 14 is angularly movable about the rocker shaft 11.

Figure 19:
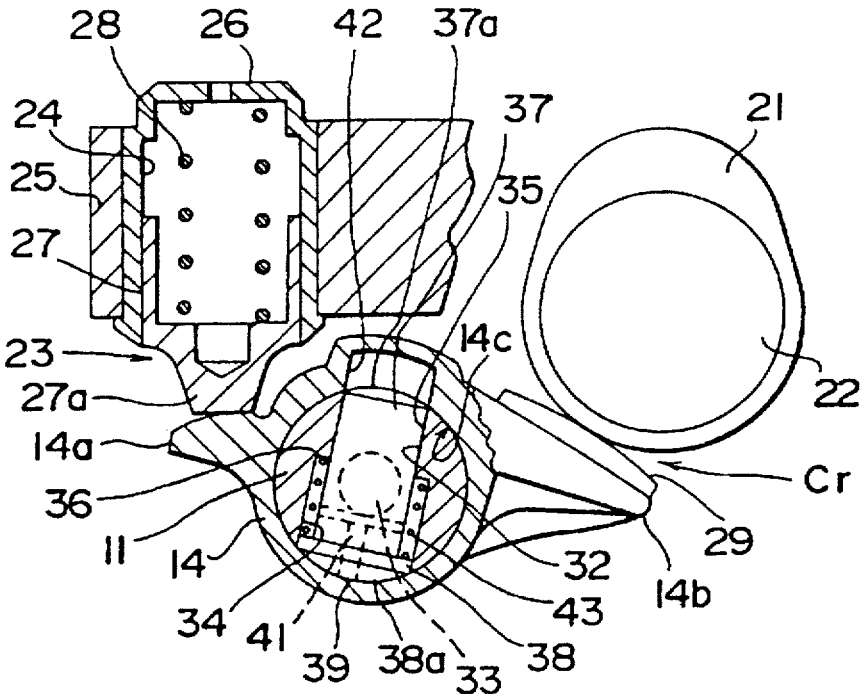
FIG. 19 is a fragmentary transverse cross sectional view taken along line XIX—XIX of FIG. 16.

The rocker shaft 11 has an engaging means R for selectively bringing the high-speed rocker arm 14 into and out of engagement with the rocker shaft 11 to engage and disengage the low- and high-speed rocker arms 13, 14. The engaging means R has a coupling pin 31 shown in FIG. 20. As shown in FIG. 19, the coupling pin 31 is mounted in a through hole 32 that is defined diametrically in the rocker shaft 11 across the axis thereof. The rocker shaft 11 also has an oil passage 33 defined axially centrally thereof. Therefore, the through hole 32 extends perpendicularly across the oil passage 33. The through hole 32 has a larger-diameter portion 34 opening at one open end thereof, and a smaller-diameter portion 35 opening at the other open end thereof, with a step 36 positioned between the larger- and smaller-diameter potions 34, 35.

Figure 20:
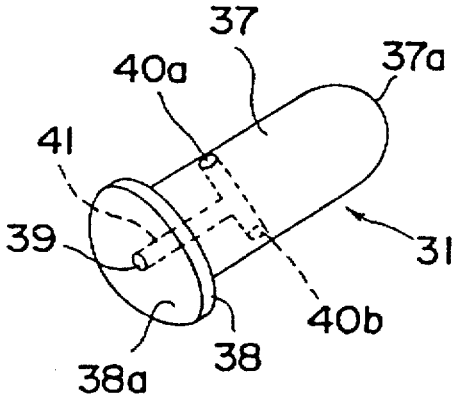
FIG. 20 is a perspective view of a coupling pin.

As shown in FIG. 20, the coupling pin 31 has a larger-diameter flange 38 on one end of a shank 37 which is substantially in the form of a round rod. The shank 37 is slidably inserted in the smaller-diameter portion 35, and the flange 38 is slidably inserted in the larger-diameter portion 34. The other end of the shank 37 has a rounded hemispherical convex surface (curved convex surface) 37a having a radius of curvature which is substantially the same as the radius of curvature of the outer circumferential surface of the rocker shaft 11. The flange 38 also has on its outer end a rounded hemispherical convex surface (curved convex surface) 38a having a radius of curvature which is substantially the same as the radius of curvature of the sliding surface of the high-speed rocker arm 14 against which the rocker shaft 11 slides. As shown in FIG. 20, the coupling pin 31 also has a substantially T-shaped oil passage 41 defined therein which provides communication between an opening 39 at the tip end of the hemispherical convex surface 38a and a pair of openings 40a, 40b at the outer circumferential surface of the shank 37. Working oil in the oil passage 33 can be supplied from the openings 40a, 40b through the oil passage 41 to an oil chamber r (FIG. 17) that is defined in confronting relation to the hemispherical convex surface 38a of the flange 38.

The high-speed rocker arm 14 has a hole 42 defined in its sliding surface (rotatable surface) slidable against the rocker shaft 11, the hole 42 being aligned with the smaller-diameter portion 35 of the through hole 32. The shank 37 of the coupling pin 31 has a tip end that can be inserted into the hole 42. A return spring 43 in the form of a coil spring is disposed between the step 36 in the through hole 32 and the flange 38 of the coupling pin 31. The coupling pin 31 is normally urged to press the hemispherical convex surface 38a against the rotatable surface of the high-speed rocker arm 14 under the force of the return spring 43. The length of the coupling pin 31 is selected such that when the hemispherical convex surface 38a is pressed against the rotatable surface of the high-speed rocker arm 14, the tip end of the shank 37 of the coupling pin 31 remains retracted within the smaller-diameter portion 35 of the through hole 32.

The oil passage 33 is held in communication with the hydraulic pressure means P that is the same as shown in FIG. 6, and the supplied hydraulic pressure is controlled by the computer 65 of the hydraulic pressure means P. Therefore, the hydraulic pressure means P will not be described in detail below.

Operation of the valve operating apparatus shown in FIG. 15 will be described below.

Figure 17:
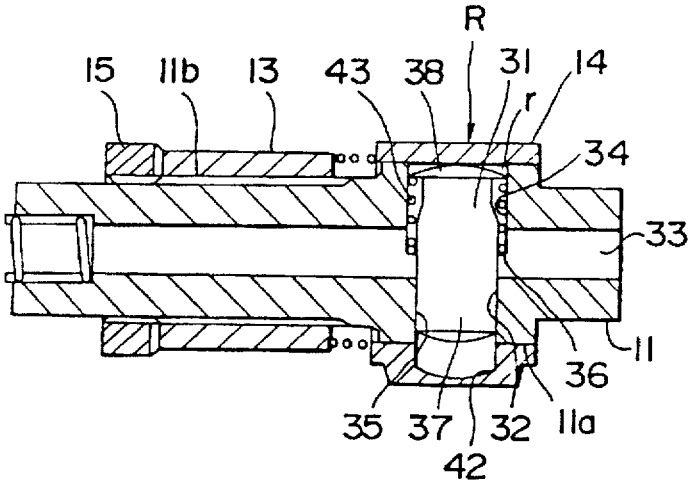
FIG. 17 is a cross-sectional view taken along line XVII—XVII of FIG. 16.

When the engine operates in a low-speed range in which the rotational speed of the engine is relatively low, the computer 65 turns off the directional control valve 63. Therefore, as shown in FIGS. 17 and 19, the tip end of the shank 37 of the coupling pin 31 is held in the through hole 32 under the bias of the return spring 43. When the high-speed rocker arm 14 is angularly moved around the rocker shaft 11 by the high-speed cam 21, the high-speed rocker arm 14 operates independently of the rocker shaft 11. Therefore, the movement of the high-speed rocker arm 14 is not transmitted to the valves 16a, 16b, which are opened and closed by the low-speed rocker arm 13.

Figure 21:
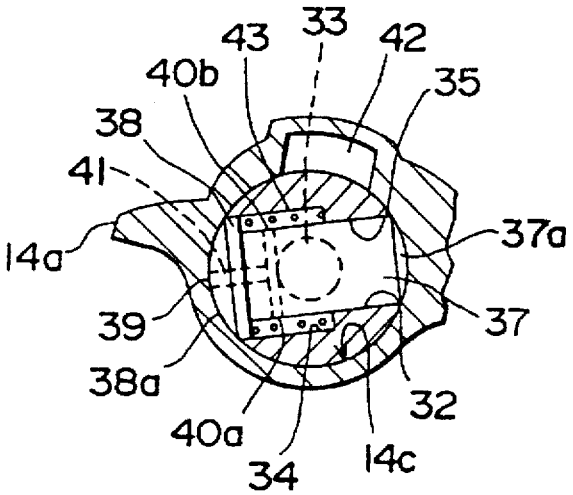
FIG. 21 is a fragmentary transverse cross-sectional view showing a high-speed rocker arm, shown in FIG. 19, which is angularly moved with respect to a rocker shaft.
Figure 22:
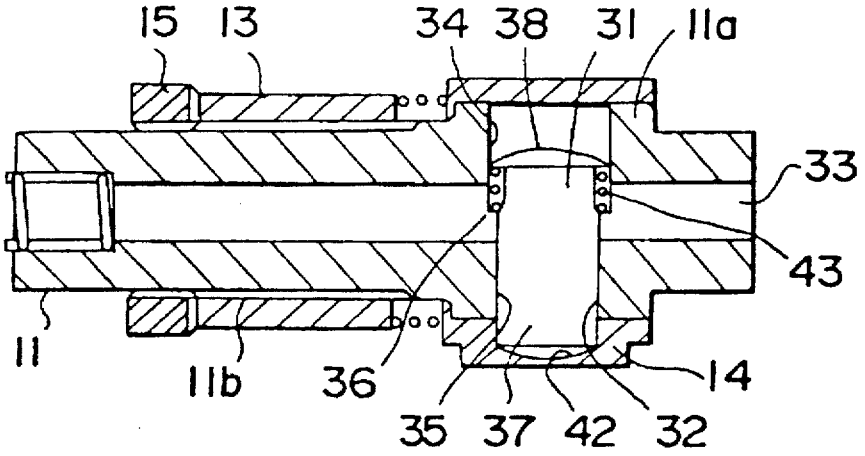
FIG. 22 is a longitudinal cross-sectional view showing the manner in which the high-speed rocker arm and the rocker shaft are coupled.
Figure 23:
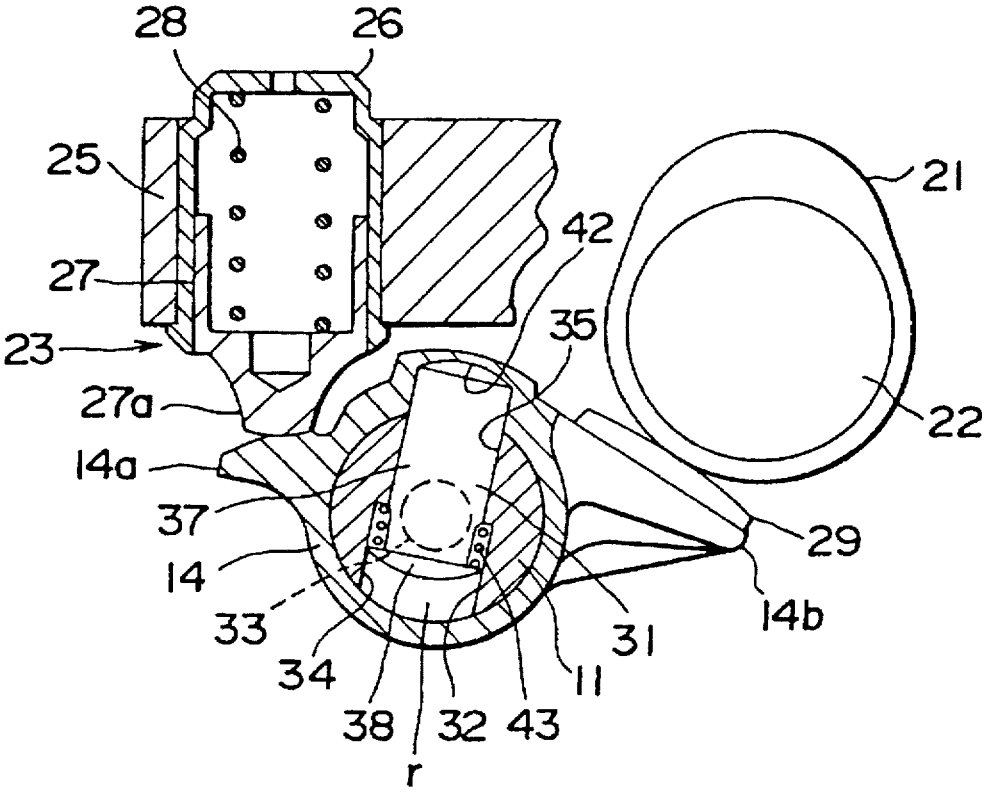
FIG. 23 is a fragmentary transverse cross-sectional view showing the manner in which the high-speed rocker arm and the rocker shaft are coupled.

When the rotational speed of the engine increases into a high-speed range, the computer 65 turns on the directional control valve 63 to supply oil under pressure through the oil passages 33, 41 to the oil chamber r. The coupling pin 31 is now displaced into the projected position against the bias of the return spring 43. Specifically, as shown in FIGS. 21 and 22, at the time the smaller-diameter portion 35 of the through hole 32 is in registry with the hole 42 in the high-speed rocker arm 14, the tip end of the shank 37 of the coupling pin 31 is shifted into the hole 42 under the supplied oil pressure against the resiliency of the return spring 43. The high-speed rocker arm 14 now engages the rocker shaft 11, so that the low- and high-speed rocker arms 13, 14 are locked together. The movement of the high-speed rocker arm 14 that is actuated by the high-speed cam 21 is transmitted through the low-speed rocker arm 13 to the valves 16a, 16b. Therefore, the valves 16a, 16b are opened and closed by the high-speed cam 21.

The valve operating apparatus shown in FIGS. 15 through 23 offers the following advantages: The through hole 32 is defined diametrically in the rocker shaft 11 across the axis thereof, and the coupling pin 31, the return spring 43, and the oil chamber r (which is defined between the inner surface of the larger-diameter portion 34 of the through hole 32, the hemispherical convex surface 38a of the coupling pin 31, and the rotatable surface 14c of the high-speed arm 14) are disposed in the through hole 32. Therefore, any components of the engaging means R are not mounted in the high-speed rocker arm 14, which is thus simplified in structure. The high-speed arm 14 is only required to have the hole 42 defined in the sliding surface (rotatable surface) thereof against which the rocker shaft 11 is slidable, the hole 42 being capable of receiving the tip end of the shank 37 of the coupling pin 31. Consequently, it is easy to fabricate the high-speed arm 14. The hole 42 is not required to be particularly high in accuracy and hence can be machined with ease because it may be dimensioned to only receive the tip end of the shank 37 of the coupling pin 31.

Furthermore, since the coupling pin 31 and the return spring 43 are housed in the through hole 32 in the rocker shaft 11, the rocker shaft 11 can be fabricated more easily than if the rocker shaft 11 had a blind hole defined therein. Inasmuch as the sliding surfaces of the through hole 32 and the coupling pin 31 can be ground relatively easily, the rocker shaft 11 and the coupling pin 31 can be manufactured with increased accuracy.

When the tip end of the shank 37 is inserted in the hole 42 in the high-speed rocker arm 14 to hold the high-speed rocker arm 14 in engagement with the rocker shaft 11, the shank 37 of the coupling pin 31 is subjected to shearing stresses. However, the shank 37 is high in mechanical strength against such shearing stresses because no oil passages are defined therein. The length of the smaller-diameter portion 35 of the through hole 32 is directly available as the length of a pin guide for supporting the coupling pin 31. The pin guide length may be relatively large so that the coupling pin 31 is free of unwanted wobbling movement and can be supported securely and stably.

Moreover, the following additional advantages are provided by the valve operating apparatus shown in FIGS. 15 through 23.

Figure 24:
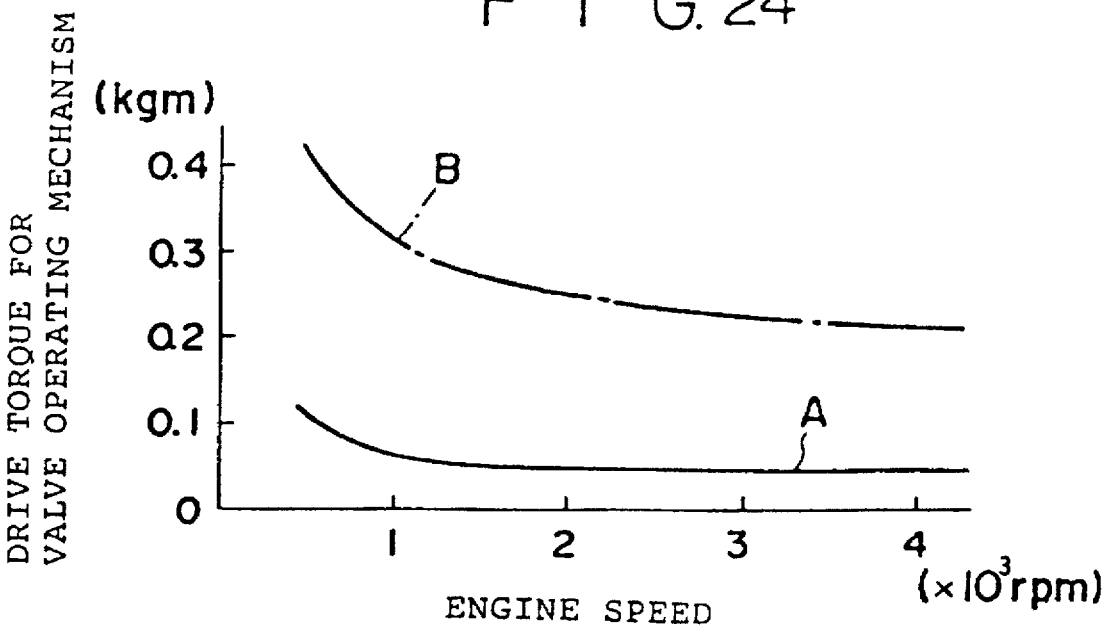
FIG. 24 is a diagram showing the relationship between the drive torque for the valve operating apparatus and the rotational speed of the engine.

The roller 17 held in rolling contact with the low-speed cam 20 is mounted on the low-speed rocker arm 13, and the slipper 29 held in sliding contact with the high-speed cam 21 is provided on the high-speed rocker arm 14. In the low-speed range of operation of the engine, the roller 17 on the low-speed rocker arm 13 rotates along the cam surface of the low-speed cam 20 to control the timing to open and close the valves 16a, 16b. Therefore, the frictional resistance between the low-speed rocker arm 13 and the cam surface of the low-speed cam 20 is about 10% lower in the low-speed range of engine operation than if the low-speed rocker arm 13 comprised a slipper-type rocker arm. As a result, the torque needed to actuate the valve operating apparatus can be reduced to ½ to ⅓ as shown in FIG. 24. In the valve operating apparatus according to the present embodiment, the high-speed rocker arm 14 is slidably held against the high-speed cam 21 by the lift mechanism 23 even in the low-speed range of operation of the engine. The slipper 29 always frictionally engages the high-speed cam 21, but the friction does not pose any significant problem as it is ⅕ or less of the friction caused by the valve spring.

FIG. 24 shows how the torque needed to actuate the valve operating apparatus varies with the rotational speed of the engine. In FIG. 24, the solid-line characteristic curve A indicates the varying torque that is required to actuate the valve operating apparatus using the low-speed rocker arm 13 with the roller 17, and the dot-and-dash-line characteristic curve B indicates the varying torque that is required to actuate the valve operating apparatus when the low-speed rocker arm 13 is in the form of a slipper-type rocker arm.

Figure 25:
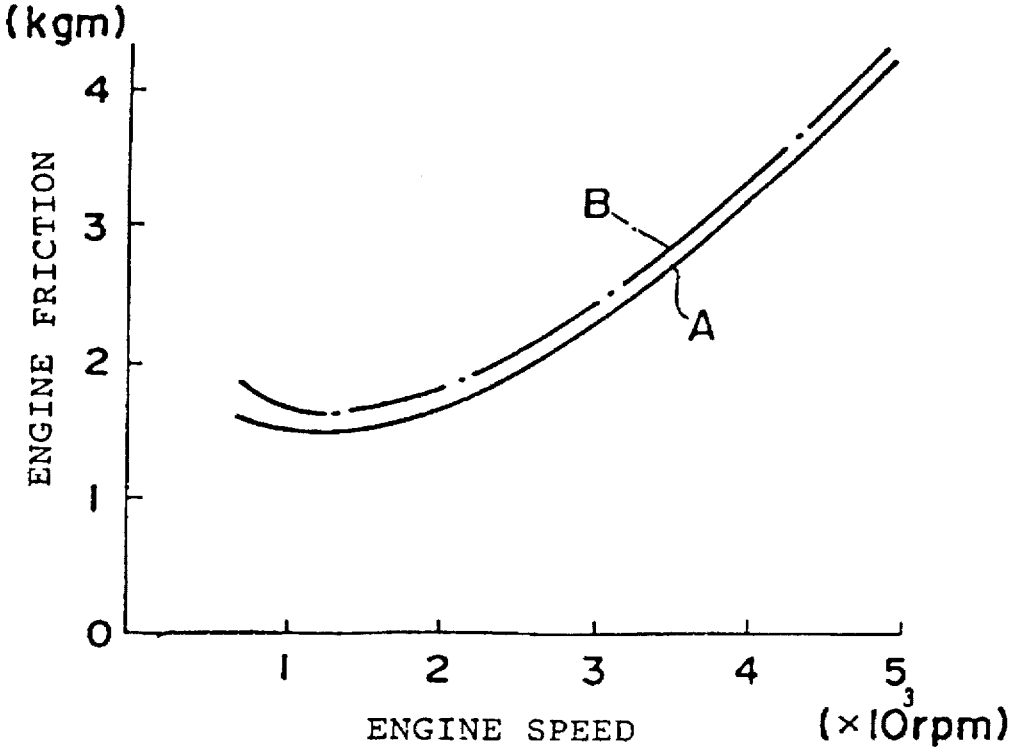
FIG. 25 is a diagram showing the relationship between the engine friction and the rotational speed of the engine.
Figure 26:
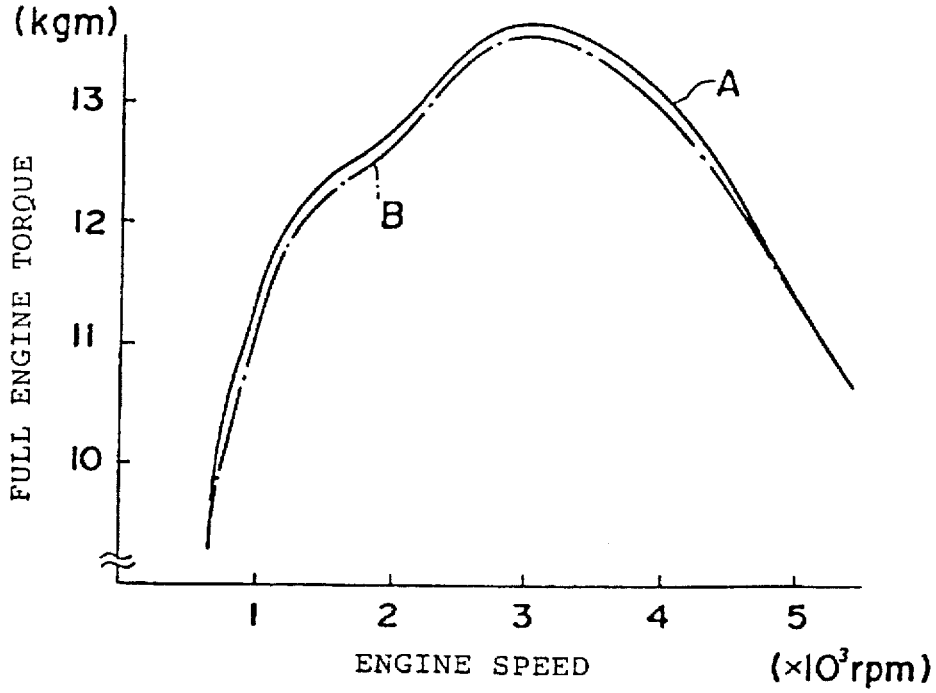
FIG. 26 is a diagram showing the relationship between the full engine torque and the rotational speed of the engine.

FIG. 25 shows how the engine frictional resistance varies depending on the rotational speed of the engine, and FIG. 26 shows how the full engine torque varies depending on the rotational speed of the engine. In each of FIGS. 25 and 16, the solid-line characteristic curve A represents the varying engine frictional resistance or the varying fully engine torque that is produced using the low-speed rocker arm 13 with the roller 17, and the dot-and-dash-line characteristic curve B indicates the varying engine frictional resistance or the varying fully engine torque that is produced when the low-speed rocker arm 13 is in the form of a slipper-type rocker arm.

Because of the reduced torque required to actuate the valve operating apparatus, the frictional resistance of the engine as a whole can be reduced about 10% in the low-speed range, as shown in FIG. 25, and the full engine torque can be increased about 1 to 2% in the low-speed range (about 4500 rpm or lower), as shown in FIG. 26.

In the high-speed range of operation of the engine, the slipper 29 of the high-speed rocker arm 14 slides along the cam surface of the high-speed cam 21 for the control of the timing to open and close the valves 16a, 16b. Therefore, the time area plotted when the valves 16a, 16b are opened in the high-speed range is prevented from undergoing a reduction which would otherwise occur if the rocker arm with the roller 17 were used in the high-speed range, with the result that the engine torque can be increased even in the high-speed range.

Figure 27:
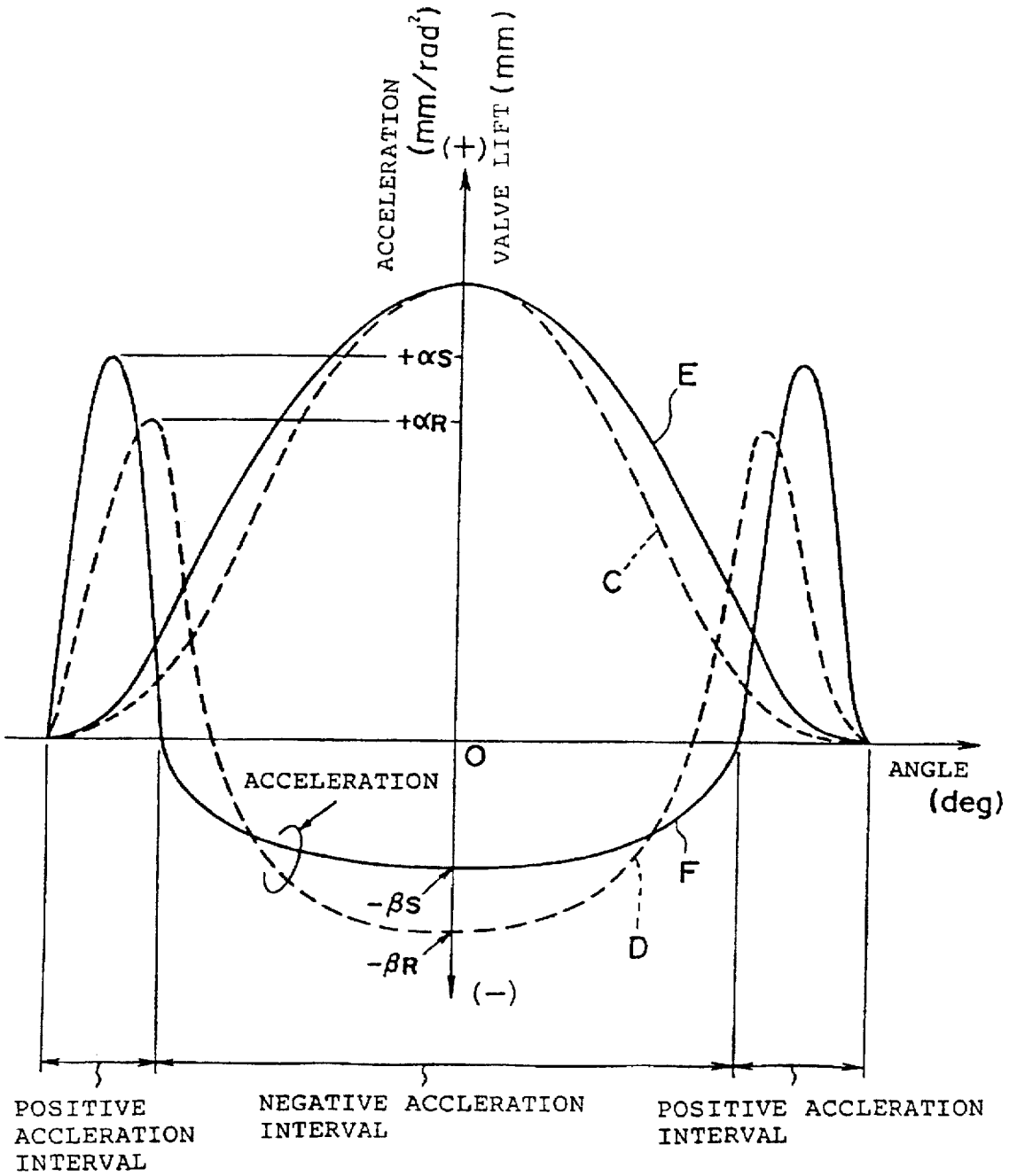
FIG. 27 is a diagram showing operating characteristics when the valves are lifted.

More specifically, it is assumed that the rocker arm (low-speed rocker arm 13) with the roller 17 were held against the high-speed cam 21. Since the radius of the roller 17 held against the high-speed cam 21 would be smaller than the radius of curvature of the slipper of the slipper-type rocker arm 14 which is held against the high-speed cam 21, when the high-speed cam 21 is angularly moved to shift its point of contact from a base-circle portion to a cam lobe to start lifting the valves 16a, 16b, the valves 16a, 16b would be lifted at a lower speed as shown in FIG. 27. FIG. 27 shows a dotted-line characteristic curve C which indicates the lift of the valves 16a, 16b actuated by the rocker arm with the roller 17, a dotted-line characteristic curve D which indicates the acceleration of the valves 16a, 16b lifted by the rocker arm with the roller 17, a solid-line characteristic curve E which indicates the lift of the valves 16a, 16b actuated by the slipper-type rocker arm, and a solid-line characteristic curve F which indicates the acceleration of the valves 16a, 16b lifted by the slipper-type rocker arm.

As can be seen from FIG. 27, if the rocker arm with the roller 17 were employed in the high-speed range, positive acceleration intervals (for the characteristic curve D) in initial and final valve lifting periods of the valves 16a, 16b would be longer than positive acceleration intervals (for the characteristic curve F) in initial and final valve lifting periods of the valves 16a, 16b that are actuated by the slipper-type rocker arm. Therefore, the speed at which the valves would be lifted would be lower, and the engine performance would be lowered in the high-speed range.

Figure 28:
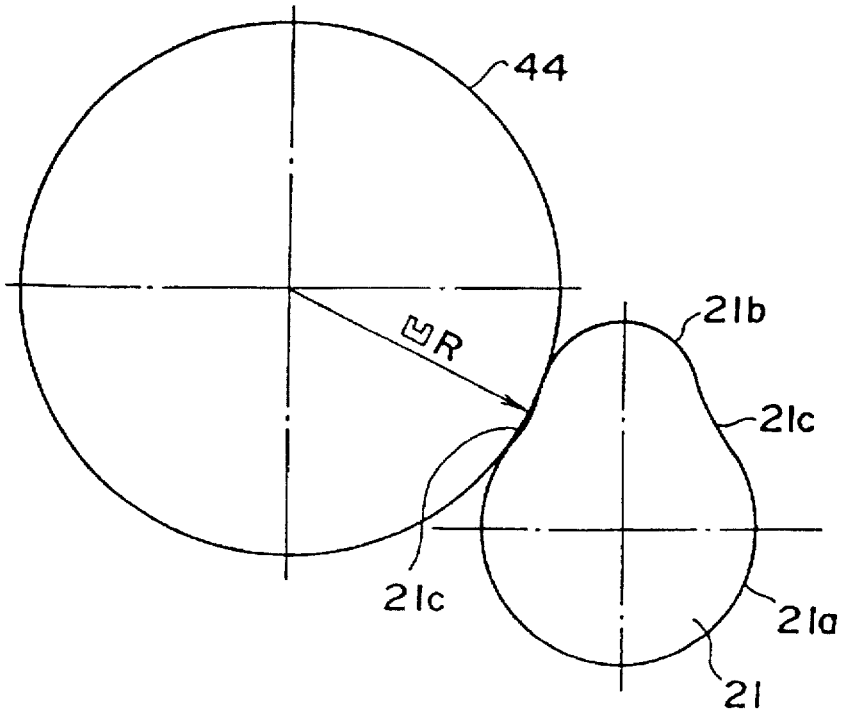
FIG. 28 is a view of concave portions of a cam.

If it is desired to employ the rocker arm with the roller 17 to obtain the same lift curves or characteristic curves as those which are provided using the slipper-type rocker arm 14, then it is necessary, as shown in FIG. 28, to reduce recesses 21c defined between a base-circle portion 21a and a cam lobe 21b of the cam 21.

The recesses 21c are ground by a grinding wheel 44 (FIG. 28) when the cam 21 is fabricated. Therefore, the dimensions of the recesses 21c are limited by the radius R of the grinding wheel 44. If the radius R of the grinding wheel 44 is reduced, the outer circumferential surface of the grinding wheel 44 is also reduced, and the grinding wheel 44 is worn rapidly, resulting in a reduction in the productivity. Because the radius R of the grinding wheel 44 cannot be reduced below a certain value, it would be impossible for the rocker arm with the roller 17 to provide the same lift curves or characteristic curves as those which are provided using the slipper-type rocker arm 14. Accordingly, the positive acceleration intervals (for the characteristic curve D) in initial and final valve lifting periods of the valves 16a, 16b would be longer than positive acceleration intervals (for the characteristic curve F) in initial and final valve lifting periods of the valves 16a, 16b that are actuated by the slipper-type rocker arm 14. Consequently, in the high-speed range of operation of the engine, the engine performance can be rendered higher using the slipper-type rocker arm 14 than using the rocker arm with the roller 17.

In the case where the positive acceleration intervals in initial and final valve lifting periods of the valves 16a, 16b are longer, then a negative acceleration interval is shorter, increasing a maximum negative acceleration β. Therefore, the maximum negative acceleration βR of the rocker arm with the roller 17 and the maximum negative acceleration βS of the slipper-type rocker arm 14 are related as follows:

$$\beta R > \beta S.$$

The limit rotational speed N of the engine beyond which the rocker arm would jump or bounce off the cam surface is given as follows:

$$N = \frac{60}{\pi} \sqrt{p \cdot g/w \cdot \beta}$$

where w is the mass of inertia of the valve operating system (as converted to the valve side), g is the gravitational acceleration, and p is the load applied by the valve spring. Since the rocker arm with the roller 17 has a greater mass w of inertia (as converted to the valve side) than that of the slipper-type rocker arm, and also since βR>βS, it can be understood that the limit rotational speed N of the engine is lower with the rocker arm with the roller 17. Therefore, if the rocker arm with the roller 17 were employed, then the engine performance would be lowered as it would become difficult to increase the engine speed into the high-speed range. The limit rotational speed N of the engine could be increased by increasing the valve spring load p, but the friction of the valve operating system would also be increased, and so would the cost of the valve spring. For these reasons, use of the slipper-type rocker arm 14 in the high-speed range would be more effective in increasing the engine performance than use of the rocker arm with the roller 17.

As described above, in the valve operating apparatus shown in FIG. 15, the roller 17 held in rolling contact with the low-speed cam 20 is mounted on the low-speed rocker arm 13, and the slipper 29 for sliding contact with the high-speed cam 21 is provided on the high-speed rocker arm 14. Therefore, the frictional resistance between the low-speed cam and the rocker arm is reduced in the low-speed range, and the time area plotted when the valves are open is prevented from being reduced for protection against a reduction in the engine output power in the high-speed range.

In the valve operating apparatus illustrated in FIG. 15, the low-speed rocker arm 13 is fixedly coupled to the rocker shaft 11, and the high-speed rocker arm 14 is rotatably supported on the rocker shaft 11, with the engaging means R used to selectively engage and disengage the rocker shaft 11 and the high-speed rocker arm 14. Other embodiments of the engaging means R will be described below with reference to FIGS. 29 through 34.

Figure 29:
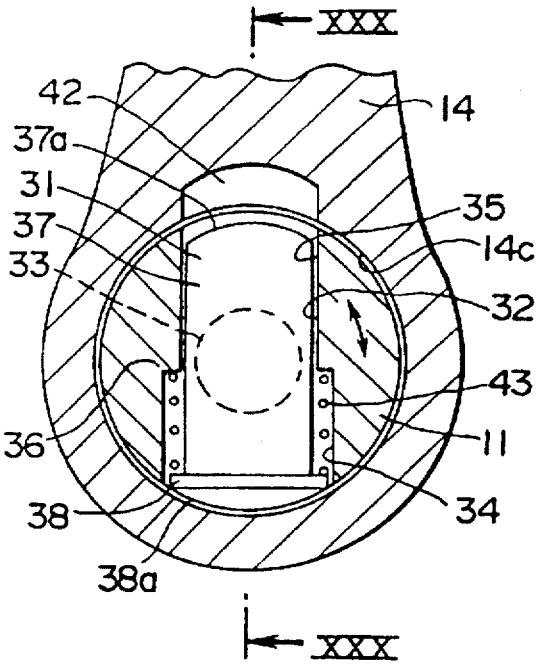
FIG. 29 is a fragmentary transverse cross-sectional view of a coupling pin, as it is mounted in place, of a valve operating apparatus according to still another embodiment of the present invention.
Figure 30:
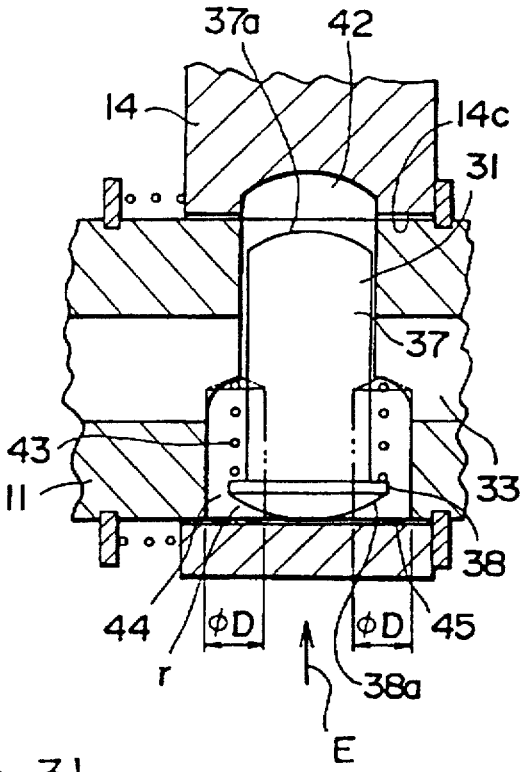
FIG. 30 is a fragmentary cross-sectional view taken along line XXX—XXX of FIG. 29.
Figure 31:
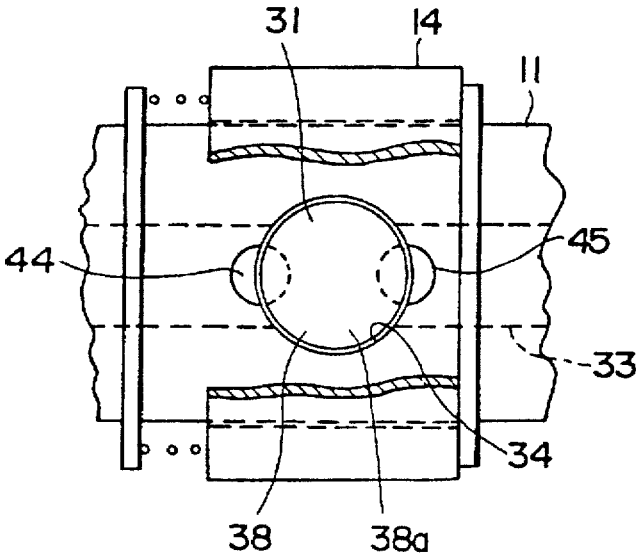
FIG. 31 is a fragmentary plan view, partly cut away, showing the parts as viewed in the direction indicated by the arrow E in FIG. 30.

The engaging means R shown in FIGS. 29 through 31 is mounted in the same high-speed rocker arm 14 as that of the valve operating apparatus shown in FIG. 15. Therefore, the high-speed rocker arm 14 will not be described in detail below.

The engaging means R has a coupling pin 31 actuatable by the actuating means D shown in FIG. 6 for selectively engaging and disengaging the rocker shaft 11 and the high-speed rocker arm 14.

The coupling pin 31 is mounted in a through hole 32 that is defined diametrically in the rocker shaft 11 across the axis thereof. The rocker shaft 11 also has an oil passage 33 defined axially centrally thereof. Therefore, the through hole 32 extends perpendicularly across the oil passage 33. The through hole 32 has a larger-diameter portion 34 opening at one open end thereof, and a smaller-diameter portion 35 opening at the other open end thereof, with a step 36 positioned between the larger- and smaller-diameter potions 34, 35. The larger-diameter portion 34 of the through hole 32 is held in communication with the oil passage 33.

As shown in FIG. 29, the coupling pin 31 has a larger-diameter flange 38 on one end of a shank 37 which is substantially in the form of a round rod. The shank 37 is slidably inserted in the smaller-diameter portion 35, and the flange 38 is slidably inserted in the larger-diameter portion 34. The other end of the shank 37 has a rounded hemispherical convex surface (curved convex surface) 37a. The flange 38 also has on its outer end a rounded hemispherical convex surface 38a which is substantially complementary in shape to the sliding surface of the high-speed rocker arm 14 against which the rocker shaft 11 slides.

The high-speed rocker arm 14 has a hole 42 defined in its sliding surface (rotatable surface) slidable against the rocker shaft 11, the hole 42 being aligned with the smaller-diameter portion 35 of the through hole 32. The shank 37 of the coupling pin 31 has a tip end that can be inserted into the hole 42. A return spring (biasing member) 43 in the form of a coil spring is disposed between the step 36 in the through hole 32 and the flange 38 of the coupling pin 31. The coupling pin 31 is normally urged to press the hemispherical convex surface 38a against the rotatable surface 14c of the high-speed rocker arm 14 under the force of the return spring 43. The length of the coupling pin 31 is selected such that when the hemispherical convex surface 38a is pressed against the rotatable surface 14c of the high-speed rocker arm 14, the tip end of the shank 37 of the coupling pin 31 remains retracted within the smaller-diameter portion 35 of the through hole 32.

As shown in FIGS. 30 and 31, oil passages 44, 45 are defined in the rocker shaft 11 in respective regions where the through hole 32 is connected to the oil passage 33. The oil passages 44, 45 serve to supply oil under pressure from the oil passage 33 to the hemispherical convex surface 38a of the coupling pin 31. These oil passages 44, 45 are defined as circular holes extending parallel to the coupling pin 31 and each having a diameter D.

The oil passage 33 is held in communication with the hydraulic pressure means P that is the same as shown in FIG. 6.

Operation of the valve operating apparatus shown in FIGS. 29 through 31 will be described below.

When the engine operates in a low-speed range in which the rotational speed of the engine is relatively low, the directional control valve 63 remains inactivated. Therefore, as shown in FIGS. 29 and 30, the hemispherical convex surface 38a of the flange 38 is pressed against the rotatable surface 14c of the high-speed rocker arm 14, and the tip end of the shank 37 of the coupling pin 31 is held in the smaller-diameter portion 35 of the through hole 32 under the bias of the return spring 43. Since the high-speed rocker arm 14 is released from the rocker shaft 11, when the high-speed rocker arm 14 is angularly moved around the rocker shaft 11 by the high-speed cam 21, the high-speed rocker arm 14 operates independently of the rocker shaft 11. Therefore, the low- and high-speed rocker arms 13, 14 operate independently of each other. The movement of the high-speed rocker arm 14 is not transmitted to the valves 16a, 16b, which are opened and closed by the low-speed rocker arm 13 that is actuated by the low-speed cam 20.

Figure 32:
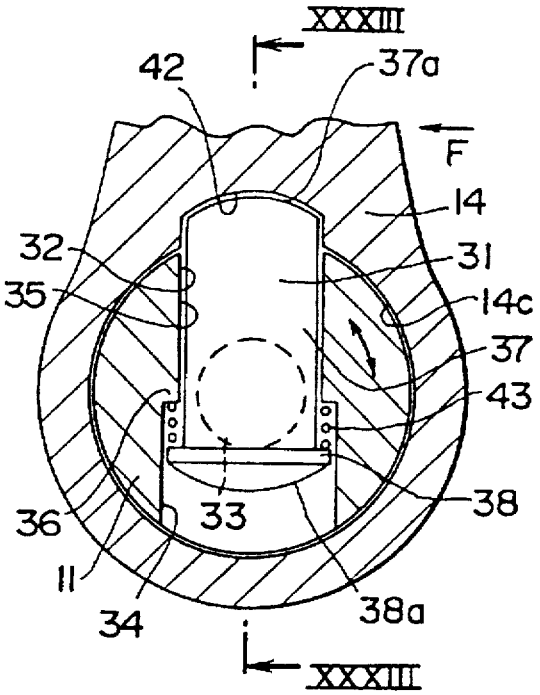
FIG. 32 is a fragmentary transverse cross-sectional view of a high-speed rocker arm and a rocker shaft of a valve operating apparatus according to a further embodiment of the present invention.
Figure 33:
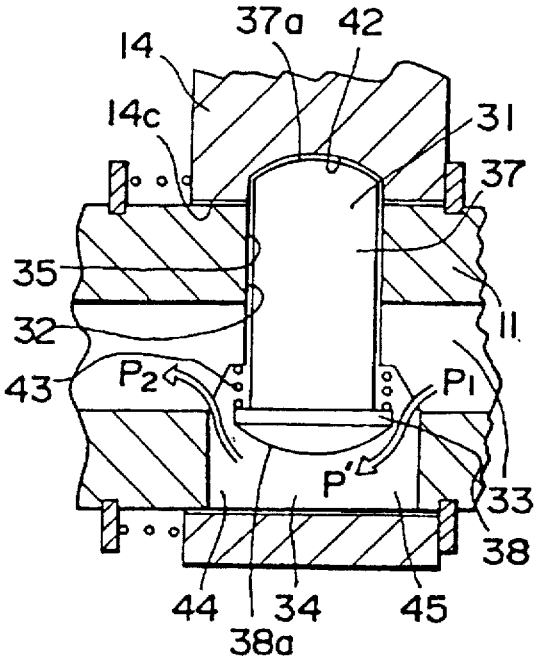
FIG. 33 is a fragmentary cross-sectional view taken along line XXXIII—XXXIII of FIG. 32.

When the rotational speed of the engine increases into a high-speed range, the directional control valve 63 is actuated to supply oil under pressure to the oil passage 43. The supplied oil under pressure is introduced from the oil passage 43 into the larger-diameter portion 34 of the through hole 32, and then supplied through the oil passages 44, 45 to the side of the hemispherical convex surface 38a of the flange 38. Because of the difference between the opposite pressure-bearing areas of the flange 38, the oil under pressure acts to push the coupling pin 31 upwardly in FIGS. 29 and 30. As a consequence, at the time the smaller-diameter portion 35 of the through hole 32 is in registry with the hole 42 in the high-speed rocker arm 14, the coupling pin 31 is shifted upwardly in FIGS. 29 and 30 against the resiliency of the return spring 43 until the tip end of the shank 37 is inserted into the hole 42 in the high-speed rocker arm 14, as shown in FIGS. 32 and 33. The high-speed rocker arm 14 now engages the rocker shaft 11, so that the low- and high-speed rocker arms 13, 14 are locked together. The movement of the high-speed rocker arm 14 that is actuated by the high-speed cam 21 is transmitted through the low-speed rocker arm 13 to the valves 16a, 16b. Therefore, the valves 16a, 16b are opened and closed by the high-speed cam 21.

Figure 43:
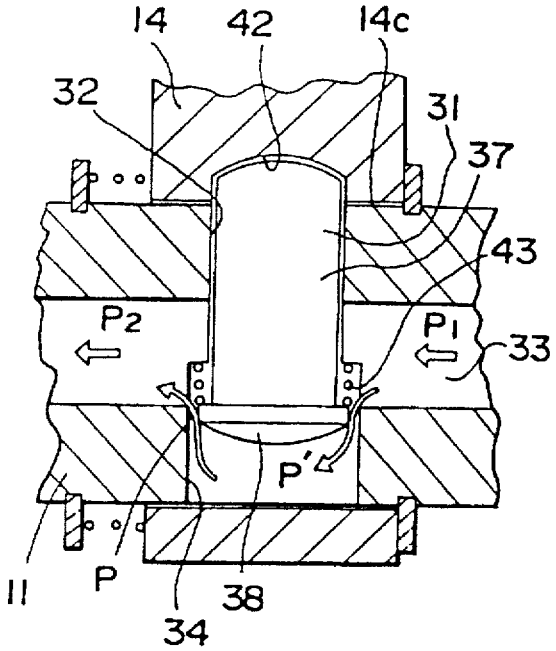
FIG. 43 is a fragmentary cross-sectional view taken along line XLIII—XLIII of FIG. 42.
Figure 42:
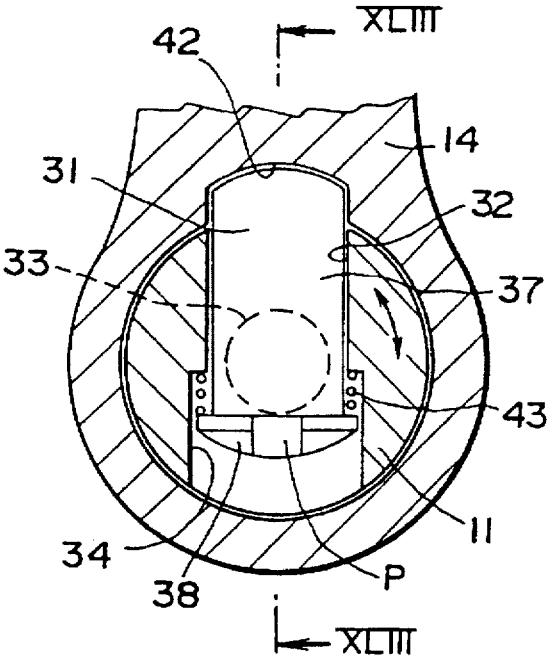
FIG. 42 is a fragmentary transverse cross-sectional view of an engaging means proposed prior to the engaging means shown in FIGS. 29 through 31.
Figure 44:
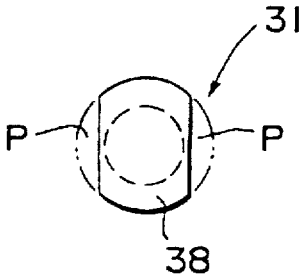
FIG. 44 is a front elevational view of a flange of a coupling pin shown in FIG. 42.

The above arrangement is advantageous for the following reasons: The oil passages 44, 45 for supplying oil under pressure from the oil passage 33 to the convex surface 38a of the coupling pin 31 are defined in the regions where the through hole 32 is coupled to the oil passage 33 in the rocker shaft 11, the oil passages 44, 45 extending substantially parallel to the coupling pin 31. Therefore, it is not necessary to define the annular oil groove 57, as shown in FIGS. 4(a), 4(b), 5(a), and 5(b), around the shank 37, and it is also not necessary to define recesses p, as shown in FIGS. 42 through 44, in the flange 38. FIGS. 42 through 44 show a coupling pin 31 that was proposed by the inventor prior to the engaging means R shown in FIGS. 29 through 31. With the coupling pin 31 proposed earlier, the recesses p provide a relatively large oil passage between the oil passage 33 and the oil chamber r. However, when the coupling pin 31 projects into the hole 42, the recesses p are constricted by the spring 43, failing to provide a sufficient cross-sectional area for the oil passage. According to the engaging means R shown in FIGS. 29 through 31, the coupling pin 31 has a higher mechanical strength than the coupling pin 31 with the annular oil groove 57 defined around the shank 37. Moreover, the length of the region wherein the shank 37 of the coupling pin 31 contacts the inner circumferential surface of the through hole 32, i.e., the length available to guide the coupling pin 31, is not reduced unlike the coupling pin 31 with the annular oil groove 57 defined around the shank 37. Consequently, the coupling pin 31 suffers reduced wobbling movement when it slides in the through hole 32 in the rocker shaft 11.

The hemispherical convex surface 38a on the end of the flange 38, which surface has a radius of curvature that is substantially the same as that of the sliding surface (rotatable surface 14c) of the high-speed rocker arm 14 against which the rocker shaft 11 slides, and the rotatable surface 14c jointly define a wedge-shaped oil chamber r as shown in FIG. 30. Before the rotational speed of the engine increases, the hemispherical convex surface 38a of the flange 38 is pressed against the rotatable surface 14c of the high-speed rocker arm 14 under the bias of the return spring 43, and the tip end of the shank 37 of the coupling pin 31 is retracted within the smaller-diameter portion 35 of the through hole 32. As the rotational speed of the engine increases, the directional control valve 63 is actuated to supply oil under pressure to the oil passage 33. The supplied oil pressure can quickly act in the wedge-shaped oil chamber r between the hemispherical convex surface 38a of the flange 38 and the rotatable surface 14c of the high-speed rocker arm 14. As a consequence, the oil pressure can act with increased response, and switching between the coupled and released conditions of the low- and high-speed rocker arms 13, 14 can smoothly be effected.

The flange 38 of the coupling pin 31 is larger in diameter than the hole 42 of the high-speed rocker arm 14. Therefore, while the high-speed rocker arm 14 is operating independently of the rocker shaft 11 in the low-speed range of operation of the engine, the flange 38 is prevented from entering the hole 42 even when the flange 38 reaches the position of the hole 42. Inasmuch as the end of the flange 38 is shaped as the hemispherical convex surface 38a which has substantially the same radius of curvature as that of the sliding surface (rotatable surface 14a) of the high-speed rocker arm 14, the flange 38 can smoothly move past the hole 42 when the flange 38 reaches the position of the hole 42.

Because no special oil passage 41 is required to be defined in the coupling pin 31, the coupling pin 31 can be fabricated more easily than the coupling 31 that has an oil passage defined therein.

Figure 34:
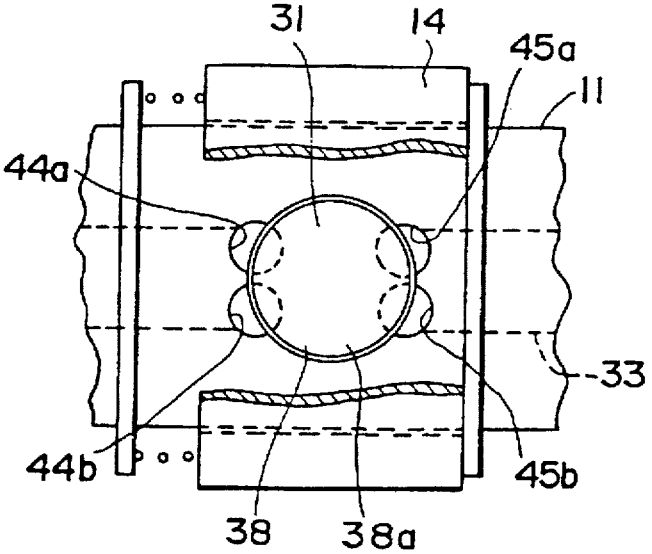
FIG. 34 is a fragmentary plan view, partly cut away, of a valve operating apparatus according to another embodiment of the present invention.

The present invention is not limited to the foregoing embodiments. As shown in FIG. 34, two pairs of oil passages 44a, 44b and 45a, 45b may be defined in the rocker shaft 11 in respective regions where the through hole 32 is connected to the oil passage 33. The increased number of oil passages 44, 45 increases the cross-sectional area of the oil passages.

The present invention may be applied to a two-valve engine in which a pair of intake and exhaust valves is disposed in one cylinder.

A clearance Cr for taking up the thermal expansion of the valves is basically required to be provided between the low- and high-speed rocker arms 13, 14 and the intake and exhaust valves 16a, 16b.

The valve operating apparatus shown in FIGS. 18 and 19 is arranged to meet the above requirement. In FIGS. 18 and 19, since a second biasing means (see a coil spring 75 in FIG. 36) described later is not mounted on the low-speed rocker arm 13, a clearance Cr is provided between the low-speed cam 20 and the low-speed rocker arm 13. The other high-speed rocker arm 14 is pressed against the high-speed cam 21 by the spring-loaded lift mechanism 23 as the first biasing means, eliminating any clearance Cr between the high-speed rocker arm 14 and the high-speed cam 21.

When the engaging means R is in the releasing position, the clearance Cr between the low-speed cam 20 and the low-speed rocker arm 13 can take up the thermal expansion of the intake and exhaust valves 16a, 16b. However, when the engaging means R is shifted into the engaging position to fix the rocker shaft 11 to the high-speed rocker arm 14 with the intake and exhaust valves 16a, 16b held against the low-speed rocker arm 13 due to gravity, the following problem occurs:

The clearances Cr between the intake and exhaust valves 16a, 16b and the low-speed rocker arm 13 and between the high-speed rocker arm 14 and the high-speed cam 21 are eliminated. Therefore, the thermal expansion of the intake and exhaust valves 16a, 16b is not taken up.

Figure 35:
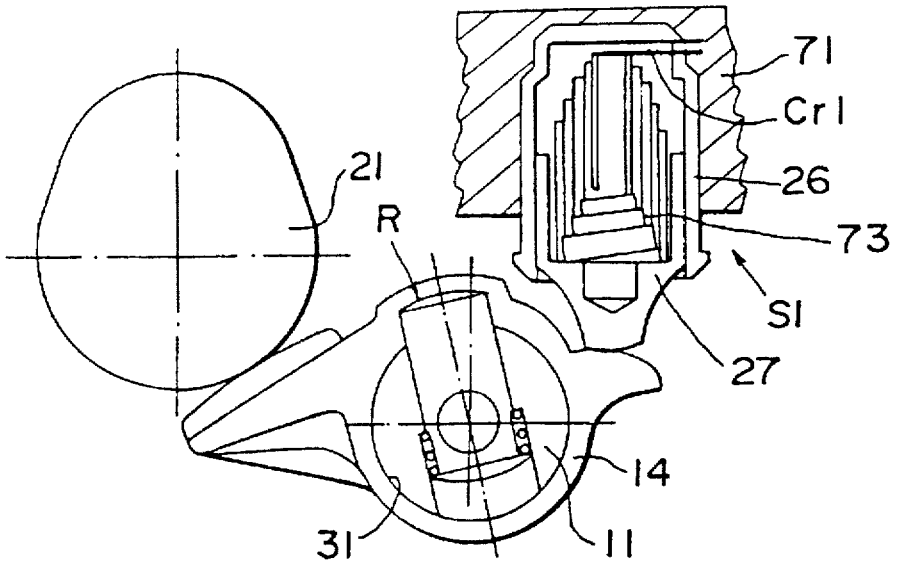
FIG. 35 is a fragmentary transverse cross-sectional view of a high-speed rocker arm of a valve operating apparatus according to still another embodiment of the present invention.
Figure 36:
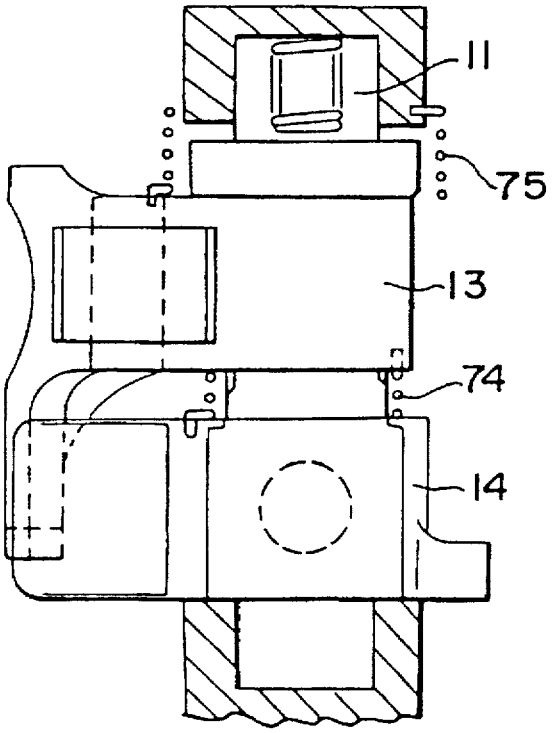
FIG. 36 is a plan view, partly in cross section, of high- and low-speed rocker arms, as they are mounted in place, of the valve operating apparatus shown in FIG. 35.
Figure 37:
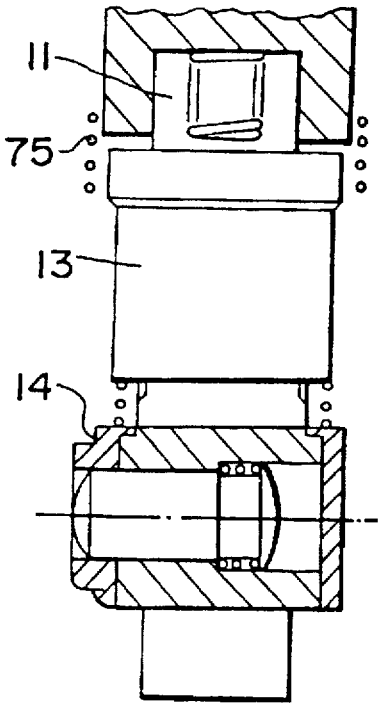
FIG. 37 is a side elevational view, partly in cross section, of the high- and low-speed rocker arms, as they are mounted in place, of the valve operating apparatus shown in FIG. 35.
Figure 38:
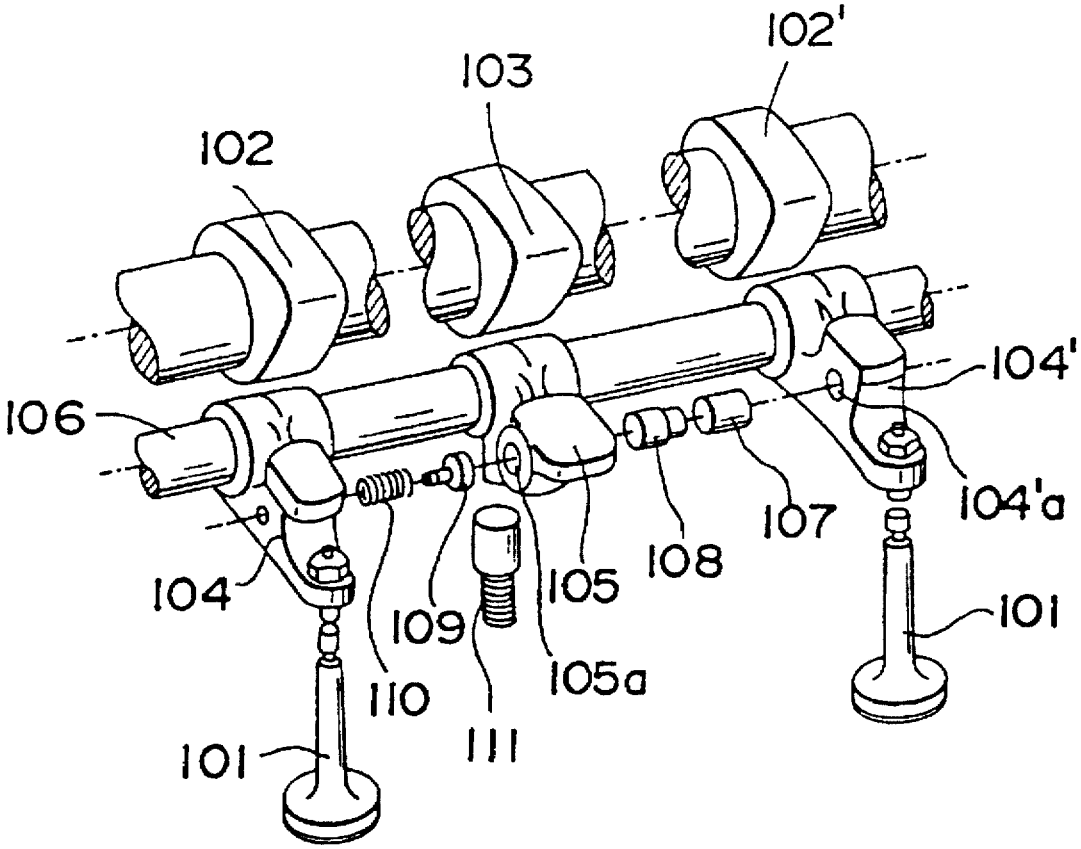
F I G. 38 PRIOR ART
FIG. 38 is a fragmentary perspective view of a conventional valve operating apparatus.
Figure 39:
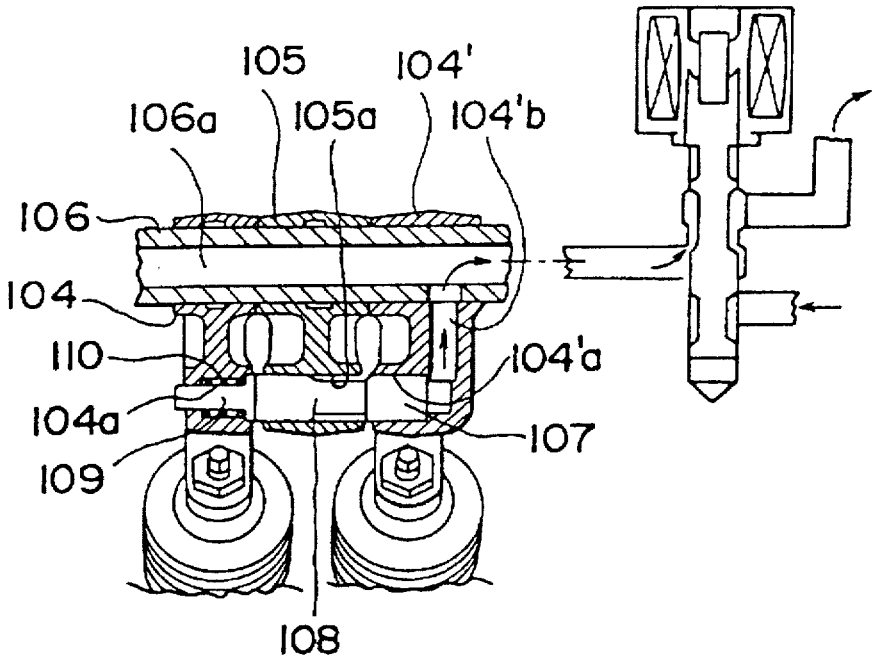
FIG. 39 PRIOR ART
FIGS. 39 and 40 are fragmentary cross-sectional views showing the conventional valve operating apparatus illustrated in FIG. 38.
Figure 40:
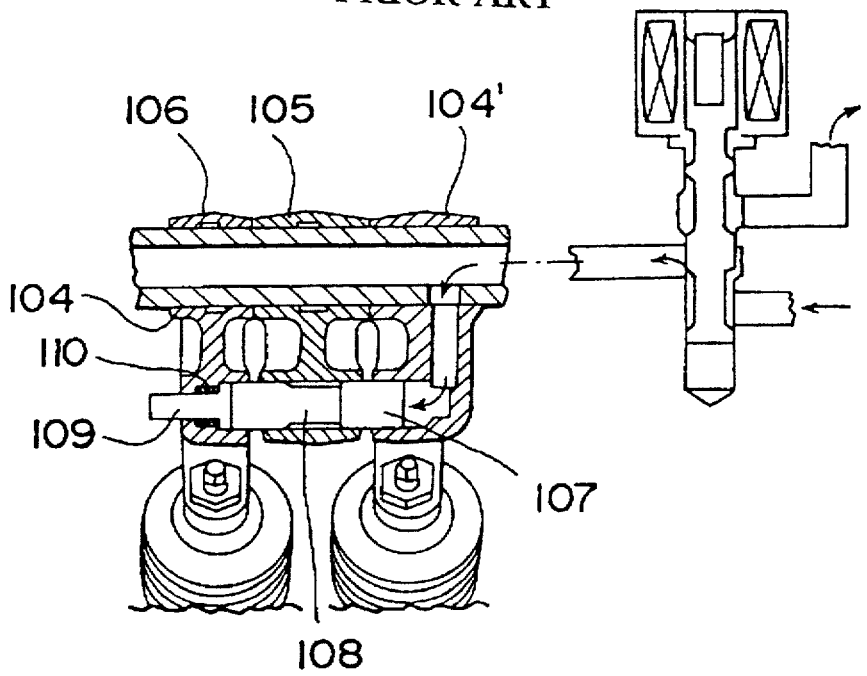
FIG. 40 PRIOR ART

In the valve operating apparatus shown in FIGS. 35 through 37, however, a coil spring 75 as a second biasing means is mounted on the low-speed rocker arm 13. The low-speed rocker arm 13 is held in confronting relationship to the intake and exhaust valves 16a, 16b through a clearance Cr under the bias of the coil spring 75 Under this condition, the engaging means R is shifted into the engaging position to fix the rocker shaft 11 to the high-speed rocker arm 14. Consequently, when the engaging means R is shifted into the engaging position, the thermal expansion of the valves can be taken up by the clearance, and the hole in the high-speed rocker arm and the through hole in the rocker shaft are prevented from being brought out of registry with each other As shown in FIG. 35, a first biasing means S1 comprises a fixed cylinder 26 mounted in a cylinder head, a movable cylinder 27 movably mounted in the fixed cylinder 26 for movement into and out of the fixed cylinder 26, the movable cylinder 27 having a tip end held against the high-speed rocker arm 14, a compression spring 73 interposed between the cylinders 26, 27 and having a relatively large spring constant, the compression spring 73 serving as a second biasing member, and a torsional thrust spring 74 (FIG. 36) interposed between the rocker shaft and the high-speed rocker arm 14, the torsional thrust spring 74 serving as a second biasing member having a relatively small spring constant for biasing the high-speed rocker arm 14 into abutment against the high-speed cam 21.

The torsional thrust spring 74 has one end engaging the rocker shaft 11 and the other end engaging the high-speed rocker arm 14. The torsional thrust spring 74 is in the form of a coil spring. When the compression spring 73 is expanded to its length in free state, the high-speed rocker arm 14 can be turned toward the high-speed cam 21 by a distance corresponding to a clearance Cr1.

Figure 41:
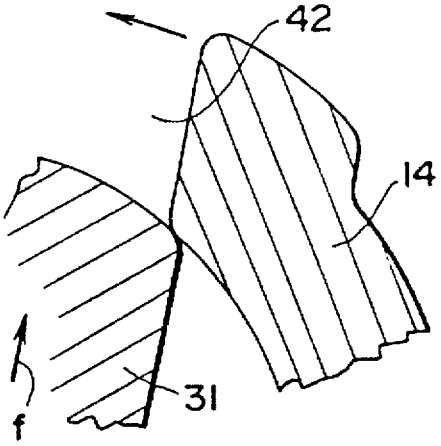
FIG. 41 PRIOR ART
FIG. 41 is an enlarged fragmentary cross-sectional view illustrative of the manner in which a conventional engaging means operates.

In the valve operating apparatus shown in FIGS. 18 and 19, when the coupling pin 31 of the engaging means R is shifted from the releasing position to the engaging position, the high-speed rocker arm 14 has been shifted by the clearance Cr by the lift mechanism 23, and the central axes of the hole 42 in the high-speed rocker arm 14 and the coupling pin 31 may not be registered with each other. As a result, when the coupling pin 31 projects toward the hole 42, the coupling pin 31 hits the edge of the hole 42, and hence a propulsive force f (FIG. 41) including an excess force for displacing the edge of the hole 42 is required to be applied to the coupling pin 31.

With the valve operating apparatus shown in FIGS. 35 through 37, the second spring constant of the first biasing means S1 is set to a relatively small value. Therefore, even if the central axes of the coupling pin 31 and the hole 42 are displaced out of alignment with each other, only a relatively small moment is applied to the high-speed rocker arm 14 by the torsional thrust spring 74. As a result, the coupling pin 31 subjected to the propulsive force f under hydraulic pressure can project into the hole 42 relatively smoothly out of interference with the edge of the hole 42. The engaging means R can thus be switched into the engaging position highly reliably The valve operating apparatus shown in FIGS. 35 through 37 is arranged such that the high-speed rocker arm 14 and the rocker shaft 11 can be engaged and disengaged by the engaging means R, and the first urging means S1 is disposed between the high-speed rocker arm 14 and the rocker shaft 11.

Instead of such an arrangement, the low-speed rocker arm 13 and the rocker shaft 11 may be engaged and disengaged by the engaging means R. In such a modification, a torsional thrust spring (not shown) of a relatively small spring constant, which serves as a second biasing means, has one end engaging a stationary engine member, and the other end engaging the low-speed rocker arm, with a clearance provided between the low-speed rocker arm and the intake and exhaust valves.

INDUSTRIAL APPLICABILITY

As described above, the valve operating apparatus according to the present invention is effective for use in OHC engines for automobiles and other applications, and is particularly advantageous when incorporated in automotive engines whose operating conditions such as the engine rotational speed vary in a wide range at all times.

What is claimed is:

1. A valve operating apparatus for use in an engine, comprising:

a camshaft with low- and high-speed cams mounted thereon;

a rocker shaft disposed adjacent to said camshaft and angularly movably mounted on a support;

a low-speed rocker arm fixed to said rocker shaft and having an end held against the stem of a valve, said low-speed rocker arm being swingable around said rocker shaft by said low-speed cam to actuate the valve;

a high-speed rocker arm rotatably supported on said rocker shaft parallel to said low-speed rocker arm, said high-speed rocker arm being swingable by said high-speed cam;

engaging means for selectively engaging and disengaging said rocker shaft and said high-speed rocker arm; and actuating means for actuating said engaging means depending on an operating condition of the engine, to selectively engage and disengage said rocker shaft and said high-speed rocker arm.

2. A valve operating apparatus according to claim 1, wherein said engaging means comprises:

a hole defined in a surface of said high-speed rocker arm which is rotatable about said rocker shaft;

a through hole defined in said rocker shaft perpendicularly to the axis of said rocker shaft and having a central axis that is aligned with the central axis of said hole when a base-circle portion of said high-speed cam is held in contact with said high-speed rocker arm;

a plunger movably mounted in said through hole for movement from a stored position in which said plunger is housed in said through hole to a projected position in which said plunger is projected toward said hole, said plunger being insertable in said hole when said central axes of the hole and the through hole are aligned with each other; and an oil chamber defined between a rear end of said plunger and the rotatable surface of said high-speed rocker arm.

3. A valve operating apparatus according to claim 1, wherein said actuating means comprises:

an oil passage defined axially in said rocker shaft; and hydraulic pressure means for supplying oil under pressure through said oil passage to said engaging means to actuate the engaging means to selectively engage and disengage said rocker shaft and said high-speed rocker arm.

4. A valve operating apparatus according to claim 1, wherein said engaging means comprises:

a hole defined in a surface of said high-speed rocker arm which is rotatable about said rocker shaft;

a through hole defined in said rocker shaft perpendicularly to the axis of said rocker shaft and having a central axis that is aligned with the central axis of said hole when a base-circle portion of said high-speed cam is held in contact with said high-speed rocker arm;

a plunger movably mounted in said through hole for movement from a stored position in which said plunger is housed in said through hole to a projected position in which said plunger is projected toward said hole, said plunger being engageable in said hole when said central axes of the hole and the through hole are aligned with each other; and an oil chamber defined between a rear end of said plunger and the rotatable surface of said high-speed rocker arm, and wherein said actuating means comprises:

an oil passage defined axially in said rocker shaft; and hydraulic pressure means for supplying oil under pressure through said oil passage to said engaging means to actuate said plunger to selectively engage and disengage said rocker shaft and said high-speed rocker arm.

5. A valve operating apparatus according to claim 1, wherein said low-speed rocker arm is integrally formed with said rocker shaft.

6. A valve operating apparatus according to claim 1, wherein said low-speed rocker arm is threaded over said rocker shaft, further including a lock nut by which said low-speed rocker arm is fixed to said rocker shaft.

7. A valve operating apparatus according to claim 1, wherein said rocker shaft and said low-speed locker arm have respective key slots, further including a key pressed into said key slots to fix said low-speed rocker arm to said rocker shaft.

8. A valve operating apparatus according to claim 1, wherein a plurality of low-speed rocker arms are mounted on said rocker shaft, said low-speed rocker arms being held against the stems of a plurality of valves, respectively, and the low-speed cams, and actuatable by said low-speed cams to actuate said valves.

9. A valve operating apparatus according to claim 1, wherein said end of the low-speed rocker arm being bifurcated into ends held respectively against the stems of valves.

10. A valve operating apparatus according to claim 1, wherein said high- and low-speed rocker arms have rollers mounted centrally thereon, said rollers being held in rolling contact with said high- and low-speed cams, respectively.

11. A valve operating apparatus according to claim 1, wherein said low-speed rocker arm has a roller mounted centrally thereon, said roller being held in rolling contact with said low-speed cam, and wherein said high-speed rocker arm has a slipper mounted centrally thereon, said slipper being held in sliding contact with said high-speed cam.

12. A valve operating apparatus according to claim 1, further including first biasing means for normally pressing said high-speed rocker arm against said high-speed cam, said first biasing means having an end held against a stationary member of the engine and the other end held against said high-speed rocker arm.

13. A valve operating apparatus according to claim 1, further including a pair of snap rings sandwiching said high-speed rocker arm and engaging an outer circumferential surface of said rocker shaft, thereby holding said high-speed rocker arm against movement axially of said rocker shaft.

14. A valve operating apparatus according to claim 1, further including:

a first snap ring held against one side of said high-speed rocker arm and engaging an outer circumferential surface of said rocker shaft;

a second snap ring spaced from an opposite side of said high-speed rocker arm and engaging the outer circumferential surface of said rocker shaft; and a spring disposed under compression between said second snap ring and said opposite side of said high-speed rocker arm, thereby holding said high-speed rocker arm against movement axially of said rocker shaft.

15. A valve operating apparatus according to claim 2, wherein said hole has a curved concave surface, said plunger having a tip end insertable into said hole, said tip end having a curved convex surface which is complementary in shape to said concave surface of the hole.

16. A valve operating apparatus according to claim 3, wherein said hydraulic pressure means comprises:

a hydraulic pressure pump for supplying oil under pressure;

an oil supply passage for supplying the oil under pressure from said hydraulic pressure pump to said oil passage in said rocker shaft;

a hydraulic pressure control mechanism disposed in said oil supply passage, for selectively supplying and blocking said oil under pressure to said oil passage; and a relief valve disposed in said oil supply passage between said hydraulic pressure control mechanism and said hydraulic pressure pump, for releasing the oil under pressure from said oil supply passage when the pressure of the oil in said oil supply passage between said hydraulic pressure control mechanism and said hydraulic pressure pump reaches a predetermined pressure.

17. A valve operating apparatus according to claim 16, wherein said hydraulic pressure control mechanism comprises:

a directional control valve shiftable between a first position in which the directional control valve supplies the oil under pressure from said hydraulic pressure pump to said oil passage, and a second position in which the directional control valve blocks the oil under pressure from said hydraulic pressure pump to said oil passage and connects said oil passage to a low-pressure oil tank;

a solenoid for shifting said directional control valve selectively to said first and second positions; and a computer for controlling said solenoid depending on the rotational speed of the engine and the load on the engine.

18. A valve operating apparatus according to claim 17, wherein said computer is programmed to energize said solenoid to actuate said directional control valve for supplying the oil under pressure to said oil passage when the engine operates in a high-speed range under a high load, and to de-energize said solenoid to inactivate said directional control valve for returning the oil under pressure from said oil passage to said oil tank when the engine operates in a low-speed range under a low load.

19. A valve operating apparatus according to claim 4, wherein said engaging means further comprises:

a flange disposed on one end of said plunger and slidable in said through hole; and a biasing member housed in said through hole and disposed between said flange and said rocker shaft, for normally urging said plunger into said stored position, and wherein said actuating means has an oil passageway for introducing the oil under pressure from said oil passage into said oil chamber.

20. A valve operating apparatus according to claim 19, wherein said oil passageway is defined in a side wall of the rocker shaft which defines said through hole.

21. A valve operating apparatus according to claim 19, wherein said oil passageway comprises:

an oil groove defined a central outer circumferential surface of said plunger; and an oil supply hole defined in said plunger and communicating from said oil groove to said oil chamber on one side of said flange of the plunger.

22. A valve operating apparatus according to claim 19, wherein said oil passageway comprises a recess defined in an outer circumferential surface of said flange of the plunger.

23. A valve operating apparatus according to claim 4, wherein said engaging means further comprises:

a larger-diameter portion at one end of said through hole, said larger-diameter portion having a diameter larger than the diameter of said hole;

a flange on said plunger, said flange being slidable in said larger-diameter portion;

a projection on an end of said plunger disposed in said larger-diameter portion; and a spring housed in said larger-diameter portion and disposed between said flange and said rocker shaft, for normally biasing said plunger into said stored position, and wherein said actuating means has an oil passageway for introducing the oil under pressure from said oil passage into said oil chamber.

24. A valve operating apparatus according to claim 23, wherein said projection comprises a curved convex surface having a radius of curvature which is substantially the same as the radius of curvature of the outer circumferential surface of said rocker shaft.

25. A valve operating apparatus according to claim 4, wherein said hole has a curved concave surface, said plunger having a tip end insertable into said hole, said tip end having a curved convex surface which is complementary in shape to said concave surface of the hole.

26. A valve operating apparatus according to claim 4, wherein said hydraulic pressure means comprises:

a hydraulic pressure pump for supplying oil under pressure;

an oil supply passage for supplying the oil under pressure from said hydraulic pressure pump to said oil passage in said rocker shaft;

a hydraulic pressure control mechanism disposed in said oil supply passage, for selectively supplying and blocking said oil under pressure to said oil passage; and a relief valve disposed in said oil supply passage between said hydraulic pressure control mechanism and said hydraulic pressure pump, for releasing the oil under pressure from said oil supply passage when the pressure of the oil in said oil supply passage between said hydraulic pressure control mechanism and said hydraulic pressure pump reaches a predetermined pressure.

27. A valve operating apparatus according to claim 26, wherein said hydraulic pressure control mechanism comprises:

a directional control valve shiftable between a first position in which the directional control valve supplies the oil under pressure from said hydraulic pressure pump to said oil passage, and a second position in which the directional control valve blocks the oil under pressure from said hydraulic pressure pump to said oil passage and connects said oil passage to a low-pressure oil tank;

a solenoid for shifting said directional control valve selectively to said first and second positions; and a computer for controlling said solenoid depending on the rotational speed of the engine and the load on the engine.

28. A valve operating apparatus according to claim 27, wherein said computer is programmed to energize said solenoid to actuate said directional control valve for supplying the oil under pressure to said oil passage when the engine operates in a high-speed range under a high load, and to de-energize said solenoid to inactivate said directional control valve for returning the oil under pressure from said oil passage to said oil tank when the engine operates in a low-speed range under a low load.

29. A valve operating apparatus according to claim 12, wherein said first biasing means comprises:

a fixed bottomed cylinder mounted on said stationary member;

a movable cylinder movably disposed in said fixed cylinder for movement into and out of the fixed cylinder, said movable cylinder having a tip end held against said high-speed rocker arm; and a compression spring interposed between said fixed cylinder and said movable cylinder.

30. A valve operating apparatus according to claim 12, wherein said first biasing means comprises:

a first biasing member interposed between said rocker shaft and said high-speed rocker arm and having a relatively small spring constant, for normally biasing said high-speed rocker arm against said high speed cam;

a second biasing member having a relatively large spring constant, for normally biasing said high-speed rocker arm from said stationary member toward said high-speed cam; and said second biasing member and said high-speed rocker arm being spaced from each other by a clearance when said high-speed rocker arm is held against a base-circle portion of said high-speed cam by said first biasing member.

31. A valve operating apparatus according to claim 30, wherein said first biasing member comprises a spring having an end engaging said rocker shaft and the other end engaging said high-speed rocker arm.

32. A valve operating apparatus according to claim 30, wherein said second biasing means comprises:

a fixed bottomed cylinder mounted on said stationary member;

a movable cylinder movably disposed in said fixed cylinder for movement into and out of the fixed cylinder, said movable cylinder having a tip end spaced from said high-speed rocker arm by a clearance when the tip end is held against said base-circle portion; and a spring interposed between said fixed cylinder and said movable cylinder.

33. A valve operating apparatus according to claim 12, further including second biasing means for normally biasing said low-speed rocker arm against said low-speed cam, said low-speed rocker arm being spaced from the stem of the valve by a small clearance.

34. A valve operating apparatus according to claim 33, wherein said second biasing means comprises a spring disposed around said rocker shaft, said spring having an end engaging said stationary member and the other end engaging said low-speed rocker arm.

35. A valve operating apparatus for use in an engine, comprising:

a camshaft with low- and high-speed cams mounted thereon;

a rocker shaft disposed adjacent to said camshaft and angularly movably mounted on a support;

a high-speed rocker arm fixed to said rocker shaft and swingable around said rocker shaft by said high-speed cam;

a low-speed rocker arm rotatably supported on said rocker shaft parallel to said high-speed rocker arm and having an end held against the stem of a valve, said low-speed rocker arm being swingable by said low-speed cam to actuate the valve;

engaging means for selectively engaging and disengaging said rocker shaft and said low-speed rocker arm; and actuating means for actuating said engaging means depending on an operating condition of the engine, to selectively engage and disengage said rocker shaft and said low-speed rocker arm.

36. A valve operating apparatus according to claim 35, wherein said engaging means comprises:

a hole defined in a surface of said low-speed rocker arm which is rotatable about said rocker shaft;

a through hole defined in said rocker shaft perpendicularly to the axis of said rocker shall and having a central axis that is aligned with the central axis of said hole when a base-circle portion of said low-speed cam is held in contact with said low-speed rocker arm;

a plunger movably mounted in said through hole for movement from a stored position in which said plunger is housed in said through hole to a projected position in which said plunger is projected toward said hole, said plunger being insertable in said hole when said central axes of the hole and the through hole are aligned with each other; and an oil chamber defined between a rear end of said plunger and the rotatable surface of said low-speed rocker arm.

37. A valve operating apparatus according to claim 35, wherein said actuating means comprises:

an oil passage defined axially in said rocker shaft; and hydraulic pressure means for supplying oil under pressure through said oil passage to said engaging means to actuate the engaging means to selectively engage and disengage said rocker shaft and said low-speed rocker arm.

38. A valve operating apparatus according to claim 35, wherein said engaging means comprises:

a hole defined in a surface of said low-speed rocker arm which is rotatable about said rocker shaft;

a through hole defined in said rocker shaft perpendicularly to the axis of said rocker shaft and having a central axis that is aligned with the central axis of said hole when a base-circle portion of said low speed cam is held in contact with said low-speed rocker arm;

a plunger movably mounted in said through hole for movement from a stored position in which said plunger is housed in said through hole to a projected position in which said plunger is projected toward said hole, said plunger being engageable in said hole when said central axes of the hole and the through hole are aligned with each other; and an oil chamber defined between a rear end of said plunger and the rotatable surface of said low-speed rocker arm, and wherein said actuating means comprises:

an oil passage defined axially in said rocker shaft; and hydraulic pressure means for supplying oil under pressure through said oil passage to said engaging means to actuate said plunger to selectively engage and disengage said rocker shaft and said low-speed rocker arm.

39. A valve operating apparatus according to claim 35, wherein said high-speed rocker arm is integrally formed with said rocker shaft.

40. A valve operating apparatus according to claim 35, wherein said high-speed rocker arm is threaded over said rocker shaft, further including a lock nut by which said high-speed rocker arm is fixed to said rocker shaft.

41. A valve operating apparatus according to claim 35, wherein said rocker shaft and said high-speed locker arm have respective key slots, further including a key pressed into said key slots to fix said high-speed rocker arm to said rocker shaft.

42. A valve operating apparatus according to claim 35, wherein a plurality of low-speed rocker arms are mounted on said rocker shaft, said low-speed rocker arms being held against the stems of a plurality of valves, respectively, and the low-speed cams, and actuatable by said low-speed cams to actuate said valves.

43. A valve operating apparatus according to claim 35, wherein said end of the low-speed rocker arm being bifurcated into ends held respectively against the stems of valves.

44. A valve operating apparatus according to claim 35, wherein said high- and low-speed rocker arms have rollers mounted centrally thereon, said rollers being held in rolling contact with said high- and low-speed cams, respectively.

45. A valve operating apparatus according to claim 35, wherein said low-speed rocker arm has a roller mounted centrally thereon, said roller being held in rolling contact with said low-speed cam, and wherein said high-speed rocker arm has a slipper mounted centrally thereon, said slipper being held in sliding contact with said high-speed cam.

46. A valve operating apparatus according to claim 35, further including first biasing means for normally pressing said high-speed rocker arm against said high-speed cam, said first biasing means having an end held against a stationary member of the engine and the other end held against said high-speed rocker arm.

47. A valve operating apparatus according to claim 35, further including a pair of snap rings sandwiching said low-speed rocker arm and engaging an outer circumferential surface of said rocker shaft, thereby holding said low-speed rocker arm against movement axially of said rocker shaft.

48. A valve operating apparatus according to claim 35, further including:

a first snap ring held against one side of said low-speed rocker arm and engaging an outer circumferential surface of said rocker shaft;

a second snap ring spaced from an opposite side of said low-speed rocker arm and engaging the outer circumferential surface of said rocker shaft; and a spring disposed under compression between said second snap ring and said opposite side of said low-speed rocker arm, thereby holding said low-speed rocker arm against movement axially of said rocker shaft.

49. A valve operating apparatus according to claim 36, wherein said hole has a curved concave surface, said plunger having a tip end insertable into said hole, said tip end having a curved convex surface which is complementary in shape to said concave surface of the hole.

50. A valve operating apparatus according to claim 37, wherein said hydraulic pressure means comprises:

a hydraulic pressure pump for supplying oil under pressure;

an oil supply passage for supplying the oil under pressure from said hydraulic pressure pump to said oil passage in said rocker shaft;

a hydraulic pressure control mechanism disposed in said oil supply passage, for selectively supplying and blocking said oil under pressure to said oil passage; and a relief valve disposed in said oil supply passage between said hydraulic pressure control mechanism and said hydraulic pressure pump, for releasing the oil under pressure from said oil supply passage when the pressure of the oil in said oil supply passage between said hydraulic pressure control mechanism and said hydraulic pressure pump reaches a predetermined pressure.

51. A valve operating apparatus according to claim 50, wherein said hydraulic pressure control mechanism comprises:

a directional control valve shiftable between a first position in which the directional control valve supplies the oil under pressure from said hydraulic pressure pump to said oil passage, and a second position in which the directional control valve blocks the oil under pressure from said hydraulic pressure pump to said oil passage and connects said oil passage to a low-pressure oil tank;

a solenoid for shifting said directional control valve selectively to said first and second positions; and a computer for controlling said solenoid depending on the rotational speed of the engine and the load on the engine.

52. A valve operating apparatus according to claim 51, wherein said computer is programmed to energize said solenoid to actuate said directional control valve for supplying the oil under pressure to said oil passage when the engine operates in a high-speed range under a high load, and to de-energize said solenoid to inactivate said directional control valve for returning the oil under pressure from said oil passage to said oil tank when the engine operates in a low-speed range under a low load.

53. A valve operating apparatus according to claim 38 wherein said engaging means further comprises:

a flange disposed on one end of said plunger and slidable in said through hole; and a biasing member housed in said through hole and disposed between said flange and said rocker shaft, for normally urging said plunger into said stored position, and wherein said actuating means has an oil passageway for introducing the oil under pressure from said oil passage into said oil chamber.

54. A valve operating apparatus according to claim 53, wherein said oil passageway is defined in a side wall of the rocker shaft which defines said through hole.

55. A valve operating apparatus according to claim 53, wherein said oil passageway comprises:

an oil groove defined a central outer circumferential surface of said plunger; and an oil supply hole defined in said plunger and communicating from said oil groove to said oil chamber on one side of said flange of the plunger.

56. A valve operating apparatus according to claim 53, wherein said oil passageway comprises a recess defined in an outer circumferential surface of said flange of the plunger.

57. A valve operating apparatus according to claim 38, wherein said engaging means further comprises:

a larger-diameter portion at one end of said through hole, said larger-diameter portion having a diameter larger than the diameter of said hole;

a flange on said plunger, said flange being slidable in said larger-diameter portion;

a projection on an end of said plunger disposed in said larger-diameter portion; and a spring housed in said larger-diameter portion and disposed between said flange and said rocker shaft, for normally biasing said plunger into said stored position, and wherein said actuating means has an oil passageway for introducing the oil under pressure from said oil passage into said oil chamber.

58. A valve operating apparatus according to claim 57, wherein said projection comprises a curved convex surface having a radius of curvature which is substantially the same as the radius of curvature of the outer circumferential surface of said rocker shaft.

59. A valve operating apparatus according to claim 38, wherein said hole has a curved concave surface, said plunger having a tip end insertable into said hole, said tip end having a curved convex surface which is complementary in shape to said concave surface of the hole.

60. A valve operating apparatus according to claim 38, wherein said hydraulic pressure means comprises:

a hydraulic pressure pump for supplying oil under pressure;

an oil supply passage for supplying the oil under pressure from said hydraulic pressure pump to said oil passage in said rocker shaft;

a hydraulic pressure control mechanism disposed in said oil supply passage, for selectively supplying and blocking said oil under pressure to said oil passage; and a relief valve disposed in said oil supply passage between said hydraulic pressure control mechanism and said hydraulic pressure pump, for releasing the oil under pressure from said oil supply passage when the pressure of the oil in said oil supply passage between said hydraulic pressure control mechanism and said hydraulic pressure pump reaches a predetermined pressure.

61. A valve operating apparatus according to claim 60, wherein said hydraulic pressure control mechanism comprises:

a directional control valve shiftable between a first position in which the directional control valve supplies the oil under pressure from said hydraulic pressure pump to said oil passage, and a second position in which the directional control valve blocks the oil under pressure from said hydraulic pressure pump to said oil passage and connects said oil passage to a low-pressure oil tank;

a solenoid for shifting said directional control valve selectively to said first and second positions; and a computer for controlling said solenoid depending on the rotational speed of the engine and the load on the engine.

62. A valve operating apparatus according to claim 61, wherein said computer is programmed to energize said solenoid to actuate said directional control valve for supplying the oil under pressure to said oil passage when the engine operates in a high-speed range under a high load, and to de-energize said solenoid to inactivate said directional control valve for returning the oil under pressure from said oil passage to said oil tank when the engine operates in a low-speed range under a low load.

63. A valve operating apparatus according to claim 46, wherein said first biasing means comprises:

a fixed bottomed cylinder mounted on said stationary member;

a movable cylinder movably disposed in said fixed cylinder for movement into and out of the fixed cylinder, said movable cylinder having a tip end held against said high-speed rocker arm; and a compression spring interposed between said fixed cylinder and said movable cylinder.

64. A valve operating apparatus according to claim 46, wherein said first biasing means comprises:

a first biasing member interposed between said rocker shaft and said high-speed rocker arm and having a relatively small spring constant, for normally biasing said high-speed rocker arm against said high-speed cam;

a second biasing member having a relatively large spring constant, for normally biasing said high-speed rocker arm from said stationary member toward said high-speed cam; and said second biasing member and said high-speed rocker arm being spaced from each other by a clearance when said high-speed rocker arm is held against a base-circle portion of said high-speed cam by said first biasing member.

65. A valve operating apparatus according to claim 64, wherein said first biasing member comprises a spring having an end engaging said rocker shaft and the other end engaging said high-speed rocker arm.

66. A valve operating apparatus according to claim 64, wherein said second biasing means comprises:

a fixed bottomed cylinder mounted on said stationary member;

a movable cylinder movably disposed in said fixed cylinder for movement into and out of the fixed cylinder, said movable cylinder having a tip end held against said high-speed rocker arm and spaced from said high-speed rocker arm by a clearance when the tip end is held against said base-circle portion; and a spring interposed between said fixed cylinder and said movable cylinder.

67. A valve operating apparatus according to claim 46, further including second biasing means for normally biasing said low-speed rocker arm against said low-speed cam, said low-speed rocker arm being spaced from the stem of the valve by a small clearance.

68. A valve operating apparatus according to claim 67, wherein said second biasing means comprises a spring disposed around said rocker shaft, said spring having an end engaging said stationary member and the other end engaging said low-speed rocker arm.

*69. A valve operating apparatus for use in an engine, comprising:*

*a camshaft with low- and high-speed cams mounted thereon;*

*a low-speed rocker arm having an end against the stem of a valve, said low-speed rocker arm being swingable by said low-speed cam to actuate said valve;*

*a high-speed rocker arm supported parallel to said low-speed rocker arm, said high-speed rocker arm being swingable by said high-speed cam;*

*transmitting means for transmitting the swing of said high-speed rocker arm to said low-speed rocker arm;*

*actuating means for actuating said transmitting means in response to an operating status of the engine so as to transmit the swing of said high-speed rocker arm to said low-speed rocker arm; and*

*first biasing means for normally pressing said high speed rocker arm against said high-speed cam, said first biasing means having a first end and a second end, said first end being disposed against an upper surface of said high-speed rocker arm, said second end being in contact with a stationary member of the engine disposed above said rocker shaft, said stationary member being non-movable with respect to a longitudinal axis of said rocker shaft.*

*70. The valve operating apparatus according to claim 69, wherein said first biasing means comprises:*

*a fixed bottomed cylinder mounted on said stationary member;*

*a movable cylindrical member movably supported in said fixed bottomed cylinder and having an end against said high speed rocker arm; and*

*a compression spring interposed between said fixed bottomed cylinder and movable cylindrical member.*

*71. The valve operating apparatus according to claim 70, wherein said fixed bottomed cylinder is fixed to a cam journal of a cylinder head of the engine.*

*72. The valve operating apparatus according to claim 12, wherein said end of said first biasing means is in contact with said stationary member disposed above said rocker shaft while said other end of said first biasing means is in contact with an upper surface of said high speed rocker arm.*

*73. The valve operating apparatus according to claim 46, wherein said end of said first biasing means is in contact with said stationary member disposed above said rocker shaft while said other end of said first biasing means is in contact with an upper surface of said high speed rocker arm.*

*74. A valve operating apparatus for use in an engine, comprising:*

*a camshaft with low- and high-speed cams mounted thereon;*

*a low-speed rocker arm having an end against the stem of a valve, said low-speed rocker arm being swingable by said low-speed cam to actuate said valve;*

*a high-speed rocker arm supported parallel to said low-speed rocker arm, said high-speed rocker arm being swingable by said high-speed cam, the swing of said high-speed rocker arm being transmitted through a transmitting mechanism to said low-speed rocker arm in response to an operating status of the engine; and*

*first biasing means for normally pressing said high-speed rocker arm against said high-speed cam, said first biasing means having a first end and a second end, said*

*first end being disposed against an upper surface of said high-speed rocker arm, said second end being in contact with a stationary member of the engine disposed above said rocker shaft, said stationary member being non-movable with respect to a longitudinal axis of said rocker shaft.*

*75. The valve operating apparatus according to claim 74, wherein said first biasing means comprises:*

*a fixed bottomed cylinder mounted on said stationary member;*

*a movable cylindrical member movably supported in said fixed bottomed cylinder and having an end against said high-speed rocker arm; and*

*a compression spring interposed between said fixed bottomed cylinder and movable cylindrical member.*

*76. The valve operating apparatus according to claim 75, wherein said fixed bottomed cylinder is fixed to a cam journal of a cylinder head of the engine.*

* * * * *